(12) United States Patent
Jesse et al.

(10) Patent No.: US 9,356,896 B2
(45) Date of Patent: May 31, 2016

(54) AUTOMATED ANNOUNCEMENT-AND-BULLETINS SYSTEM

(71) Applicant: IVY CORP., Redmond, WA (US)

(72) Inventors: Mary Jesse, Redmond, WA (US); Steven Michael Knox, Redmond, WA (US)

(73) Assignee: IVY CORP., Redmond, WA (US)

( * ) Notice: Subject to any disclaimer, the term of this patent is extended or adjusted under 35 U.S.C. 154(b) by 393 days.

(21) Appl. No.: 13/899,482

(22) Filed: May 21, 2013

(65) Prior Publication Data

US 2014/0164536 A1 Jun. 12, 2014

Related U.S. Application Data

(60) Provisional application No. 61/649,503, filed on May 21, 2012.

(51) Int. Cl.
*H04L 12/58* (2006.01)
*H04L 12/18* (2006.01)

(52) U.S. Cl.
CPC .......... *H04L 51/066* (2013.01); *H04L 12/1859* (2013.01)

(58) Field of Classification Search
USPC ........................................................ 709/206
See application file for complete search history.

(56) References Cited

U.S. PATENT DOCUMENTS

2007/0094409 A1* 4/2007 Crockett et al. .............. 709/233

* cited by examiner

*Primary Examiner* — Tu Nguyen
(74) *Attorney, Agent, or Firm* — Olympic Patent Works PLLC

(57) ABSTRACT

The current application is related to communications and, in particular, to an announcement-and-bulletins system that allows for flexible and efficient distribution of announcements and bulletins through many different types of communications media and communications devices. The announcement-and-bulletins system can be managed and maintained from a variety of different types of devices and can distribute information to users through many different types of communications media and user devices.

17 Claims, 40 Drawing Sheets

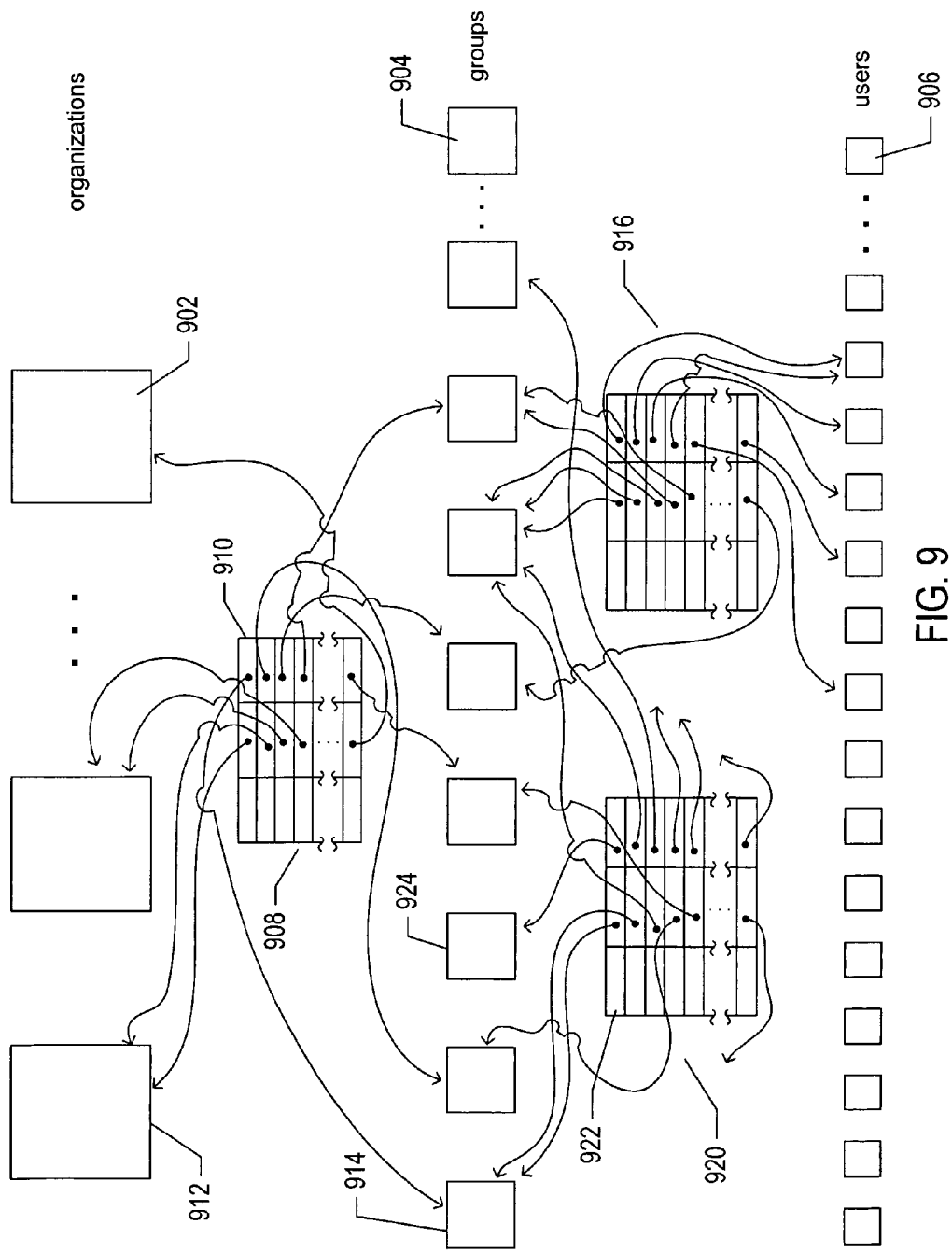

AUTOMATED ANNOUNCEMENT-AND-BULLETINS SYSTEM

CROSS-REFERENCE TO RELATED APPLICATION

This application claims the benefit of Provisional Application No. 61/649,503, filed May 21, 2012.

TECHNICAL FIELD

The current application is related to communications and, in particular, to an announcement-and-bulletins system that allows for flexible and efficient distribution of announcements and bulletins through many different types of communications media and communications devices.

BACKGROUND

Electronic communications has rapidly developed and evolved over the past 150 years. The development of telephonic voice communications in the latter 1800's revolutionized society and communications within organizations, including businesses, commercial offices, and governmental and educational institutions. For many years, the telephone and hand-delivered mail were the primary forms of communications used within organizations. However, with the advent of computer technology, beginning in the 1950's, and with later development and commercialization of mobile telephones and other technologies, a wide array of various types of communications media and devices are now commonly available. These various different types of communications media and devices provide for distribution and exchange of many different types of information to individuals in various geographical locations. As a result, people today have an enormous range of communications capabilities at their disposal with which to communicate with one another. However, because of the number of and variety of different types of communications media and devices, organizing and managing systematic information distribution among the members of an organization is currently a vastly more complex undertaking than in earlier times. While efforts have been undertaken to provide technological bridges between different types of communications media and devices, there are few organization-level communications systems that address the emerging complexities of interpersonal communications within organizations. Individuals, organizations, and designers and manufacturers of communications systems continue to seek new methods and systems for organizing and managing information exchange and distribution within organizations in order to take full advantage of the enormous capabilities of modern communications technologies.

SUMMARY

The current application is related to communications and, in particular, to an announcement-and-bulletins system that allows for flexible and efficient distribution of announcements and bulletins through many different types of communications media and communications devices. The announcement-and-bulletins system can be managed and maintained from a variety of different types of devices and can distribute information to users through many different types of communications media and user devices.

BRIEF DESCRIPTION OF THE DRAWINGS

FIG. 9 illustrates certain types of stored data that represent organizations and organizational structures according to the current application.

DETAILED DESCRIPTION

The current application is directed to announcement-and-bulletin subsystems implemented within automated systems for facilitating information distribution and information exchange among members of organizations As mentioned above, these automated communications systems are motivated by the rapidly increasing complexities of intra-organizational communications resulting from the rapidly evolving personal-communications technologies, from personal-computer-based information exchange to mobile phones and even more recently emerged communications technologies.

Figure 1:
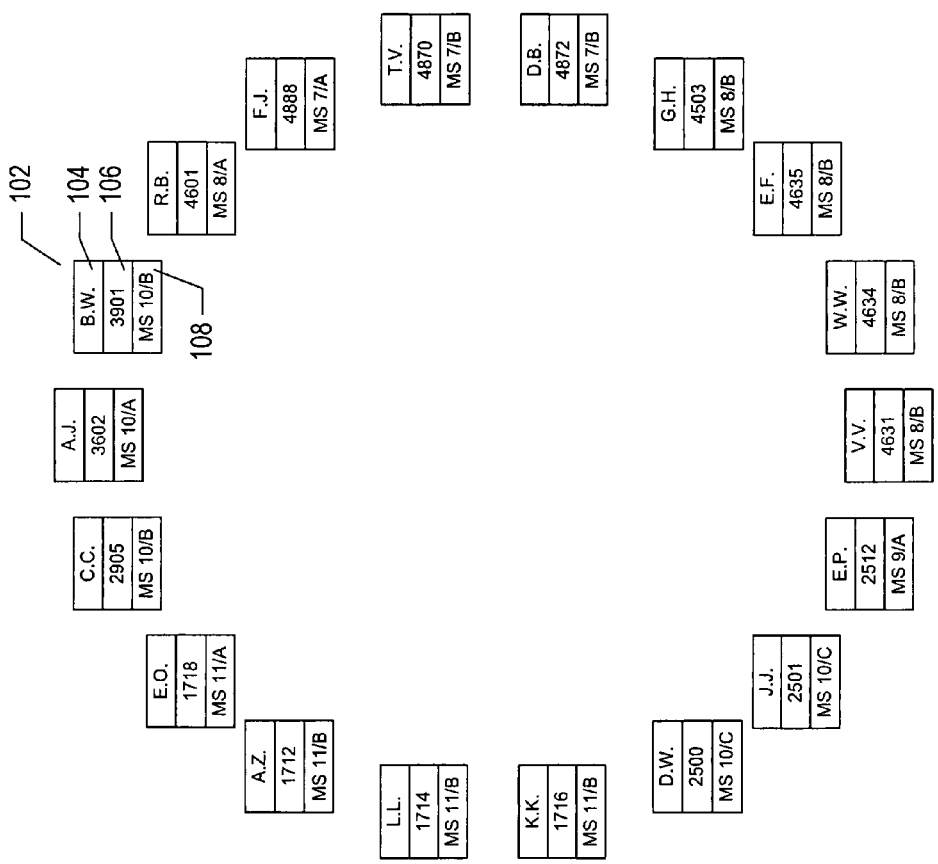
FIGS. 1-3 illustrate traditional information distribution and information exchange within organizations prior to the revolution in interpersonal communications brought about by the development and commercialization of personal computers, mobile telephones, and other relatively recently emerging technologies.
Figure 2:
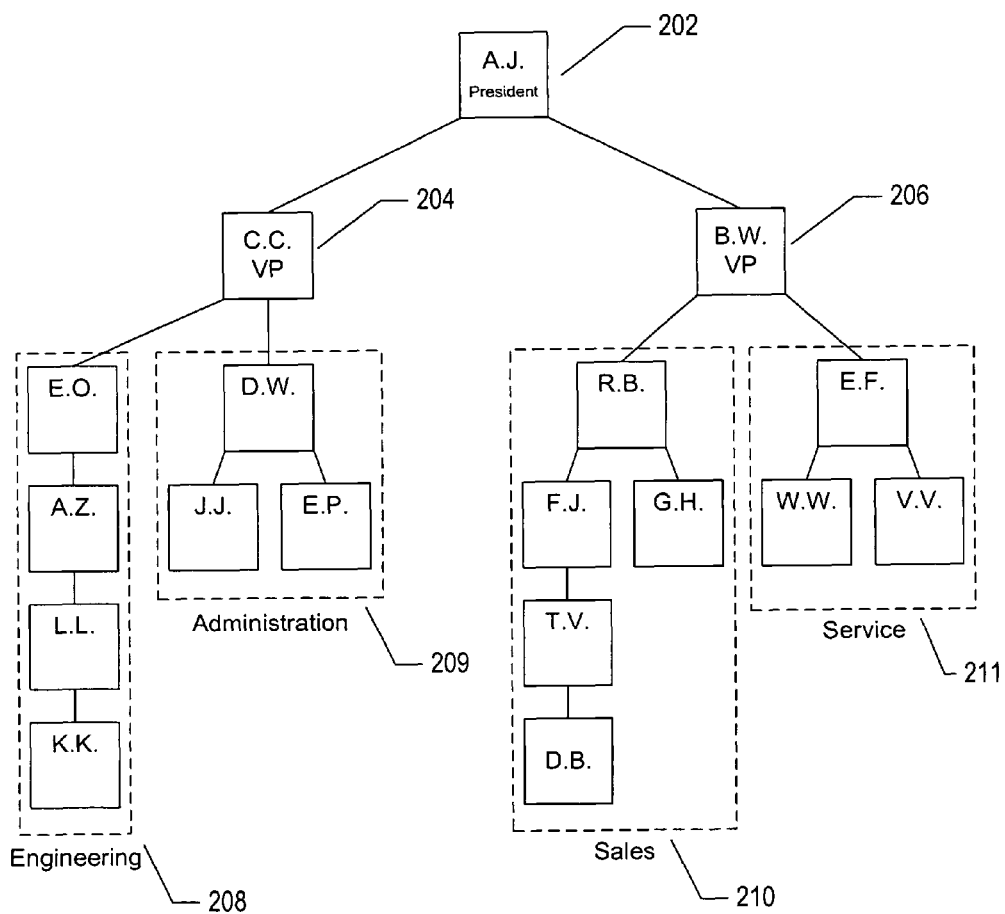
Figure 3:
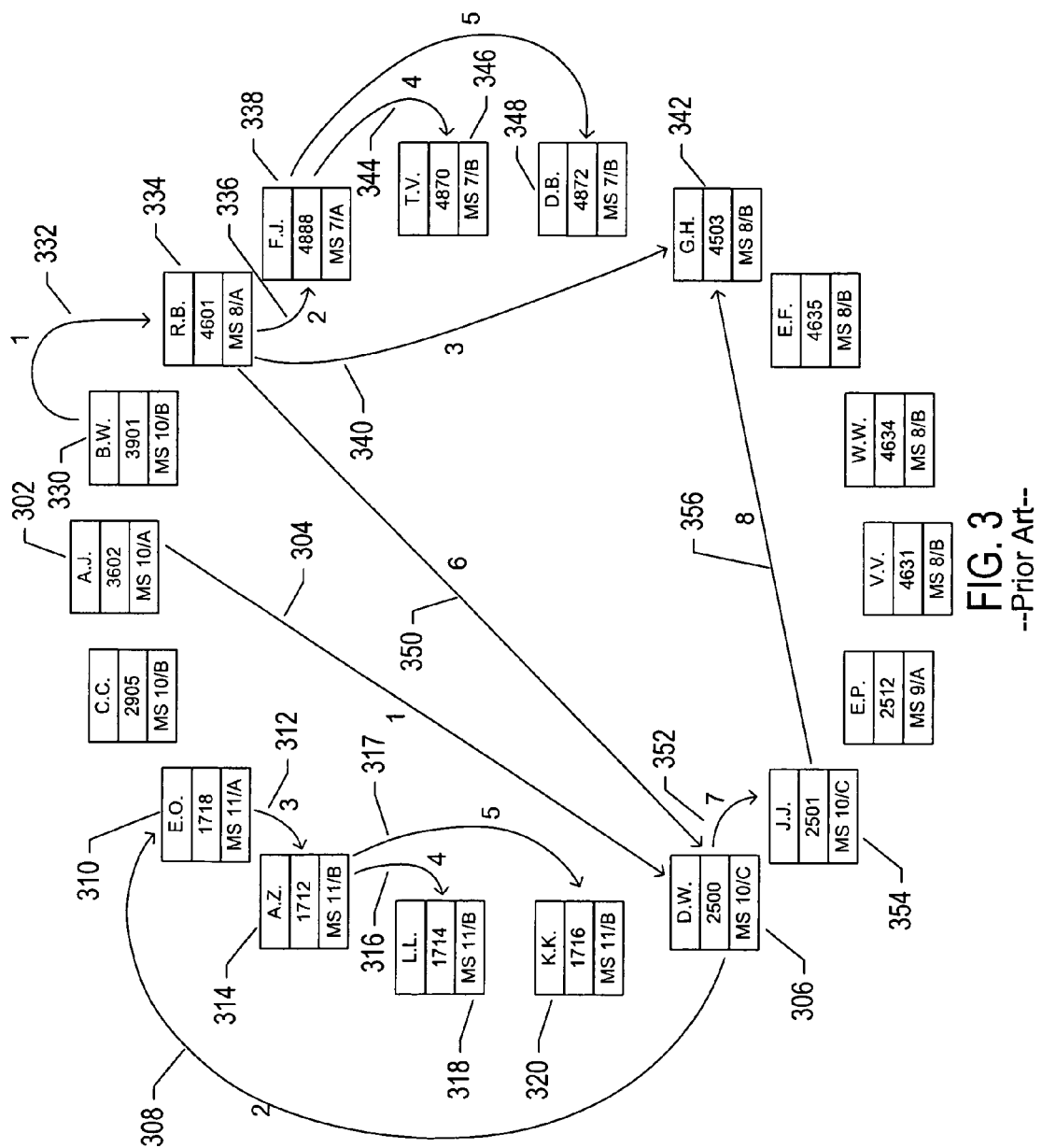

FIGS. 1-3 illustrate traditional information distribution and information exchange within organizations prior to the revolution in interpersonal communications brought about by the development and commercialization of personal computers, mobile telephones, and other relatively recently emerging technologies. FIG. 1 illustrates 18 members of a small organization, such as a commercial office or business. In FIG. 1, each member of the organization is represented by a rectangular record, such as rectangular record 102 that includes the member's name, shown in FIG. 1 as a pair of initials, the member's phone extension, and the member's mail stop, or intra-organization mail address, including initials "A. J." 104, phone extension "3901" 106, and mail stop "MS 10/B" 108 for member 102. Prior to development of modern computer systems and other processor-driven communications devices, telephones and hand-delivered mail messages were the primary methods for communication within organizations.

FIG. 2 shows an organizational chart for the organization represented in, and discussed with respect to, FIG. 1. As shown in FIG. 2, the organization includes a president 202, two vice presidents 204 and 206, and four multi-member departments 208-211. In traditional organizations, at the time that telephones and hand-delivered mail were the only practical intra-organization communications methods, the organizational structure was generally relatively static and monolithic. The organizational simplicity and the simplicity in choice of available intra-organizational communications means allowed for relatively efficient information exchange.

FIG. 3 illustrates several different information-distribution scenarios in the traditional organization described with reference to FIGS. 1 and 2. In a first scenario, the president 302 (202 in FIG. 2) needs to announce a policy change to members of the engineering group 310, 314, 318, and 320 (208 in FIG. 2). The president first decides whether the announcement requires telephone distribution of the information or whether, instead, the announcement can be printed and distributed by hand delivery. Assuming that, as a result of delivery-time considerations, the president elects to distribute the announcement by telephone, the president 302 calls 304 an administrator 306 whom the president directs to distribute the announcement, by telephone, to the engineering group. The administrator 306 next calls 308 the manager of the engineering group 310 who, in turn, calls 312 a senior member of the engineering group 314 and instructs this senior member of the engineering group to inform other members of the engineering group. The senior member of the engineering group 314 then calls 316-317 the remaining members of the engineering group 318 and 320, respectively. In a second scenario, a vice president 330 decides to use telephone messaging to announce quarterly sales figures to the members of the sales division (210 in FIG. 2). The vice president calls 332 the director of the sale division 334 and instructs the director of the sale division to inform the other members of the sales division. The director 334 then calls 336 the lead member 338 of the eastern sales group and instructs the lead member of the eastern sales group to notify the remaining members of the eastern sales group by telephone. The director next calls 340 the only member of the western sales division 342. Meanwhile, the director of the eastern sales division calls 344-345 the remaining members of the eastern sales division 346 and 348, respectively. Unfortunately, the director is unable to reach the member of the western sales division 342 by telephone. Therefore, the director places a call 350 to the administrator 306 to contact the member of the western sales division. The administrator 306 calls 352 an administrative assistant 354 who determines that the sole member of the western sales division is currently traveling, and reachable at a hotel, and then directly calls 356 member 342 at the hotel.

The traditional office communications, discussed above with reference to FIG. 3, work reasonably well due to the simplicity of the structure of the organization as well as the limited choices for communicating with organization members. However, even in this simple example, certain deficiencies can be observed. First, because of the hierarchical nature of the structure of the organization, and because of the one-to-one mode of communications provided by traditional telephone calls, disseminating information within the hierarchical organization structure is accompanied by a hierarchy of individual telephone calls and attendant delays in information transmission. Another deficiency is that, in many cases, one or a very few members, such as the administrator 306, becomes a bottleneck or hub for communications, since the administrator is often the first person called in order to distribute information by telephone. Yet another deficiency is that, when a party cannot be directly reached by telephone, a relatively time-intensive and expensive alternative communications strategy must be employed, such as that represented by telephone calls 350, 352, and 356 in FIG. 3. However, for many years, intra-organization communication generally followed this approach.

Figure 4:
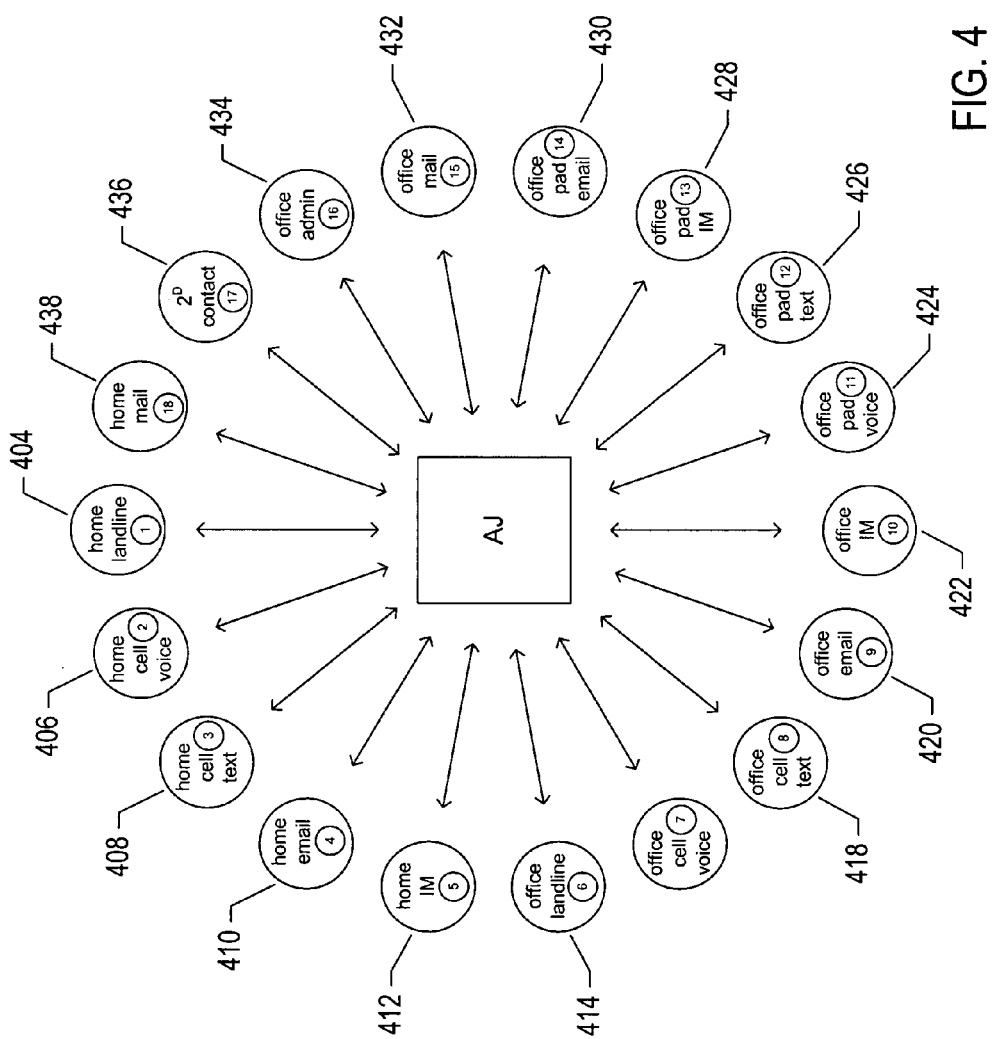
FIG. 4 illustrates one dimension of the complexities of modern inter-personal communications.

By contrast to the traditional organization and traditional communications methods discussed above with reference to FIGS. 1-3, current technologies provide a wealth of different communications capabilities as well as a forest of complexities associated inter-personal communications within an organization. FIG. 4 illustrates one dimension of the complexities of modern inter-personal communications. In FIG.

1, each member of the organization is associated with two communications addresses: a telephone extension and a mail stop. By contrast, consider the number of different communications devices, associated with different communications addresses, available to a particular member of an organization currently, shown in FIG. 4. The company president A. J. 402 may receive information and transmit information through many different communications media and devices, including: (1) a home landline telephone 404; (2) voice communications via a home cell phone 406; (3) text messaging via a home cell phone 408; (4) email via a home computer 410; (5) instant messaging via a home computer 412; (6) voice communications via an office landline telephone 414; (7) voice communications via an office cell phone 416; (8) text messaging via an office cell phone 418; (9) email via an office computer 420; (10) instant messaging via an office computer 422; (11) voice communications via an office mobile-computing device 424; (12) text messaging via an office mobile-computing device 426; (13) instant messaging via an office mobile-computing device 428; (14) email via an office mobile computing-device 430; (15) hand-delivered office mail 432; (16) contacting an office administrative assistant who then contacts the company president by any of various different means shown in FIG. 4 434; (17) contacting a secondary contact for the president, such as the president's husband, by any of various means 436; and (18) home postal delivery 438.

In fact, the various communications media and devices, shown in FIG. 4, may actually be only a subset of the communications media and devices available to the company president. Whereas, in traditional organizations of simpler times, one needed to consider only essentially two different types of communications by which to distribute information to, or exchange information with, a particular member of the organization, in current organizations, there is a bewildering array of different possibilities for communicating with a member of the organization at any particular point in time. Just keeping track of all these different types of communications media and devices and their communications addresses represents a significant problem. However, the large diversity of possibilities for contacting a particular member, when compounded over all of the members of an organization, creates a very difficult problem for anyone seeking to distribute information, since so many different possibilities need to be considered on a member-by-member basis.

Figure 5:
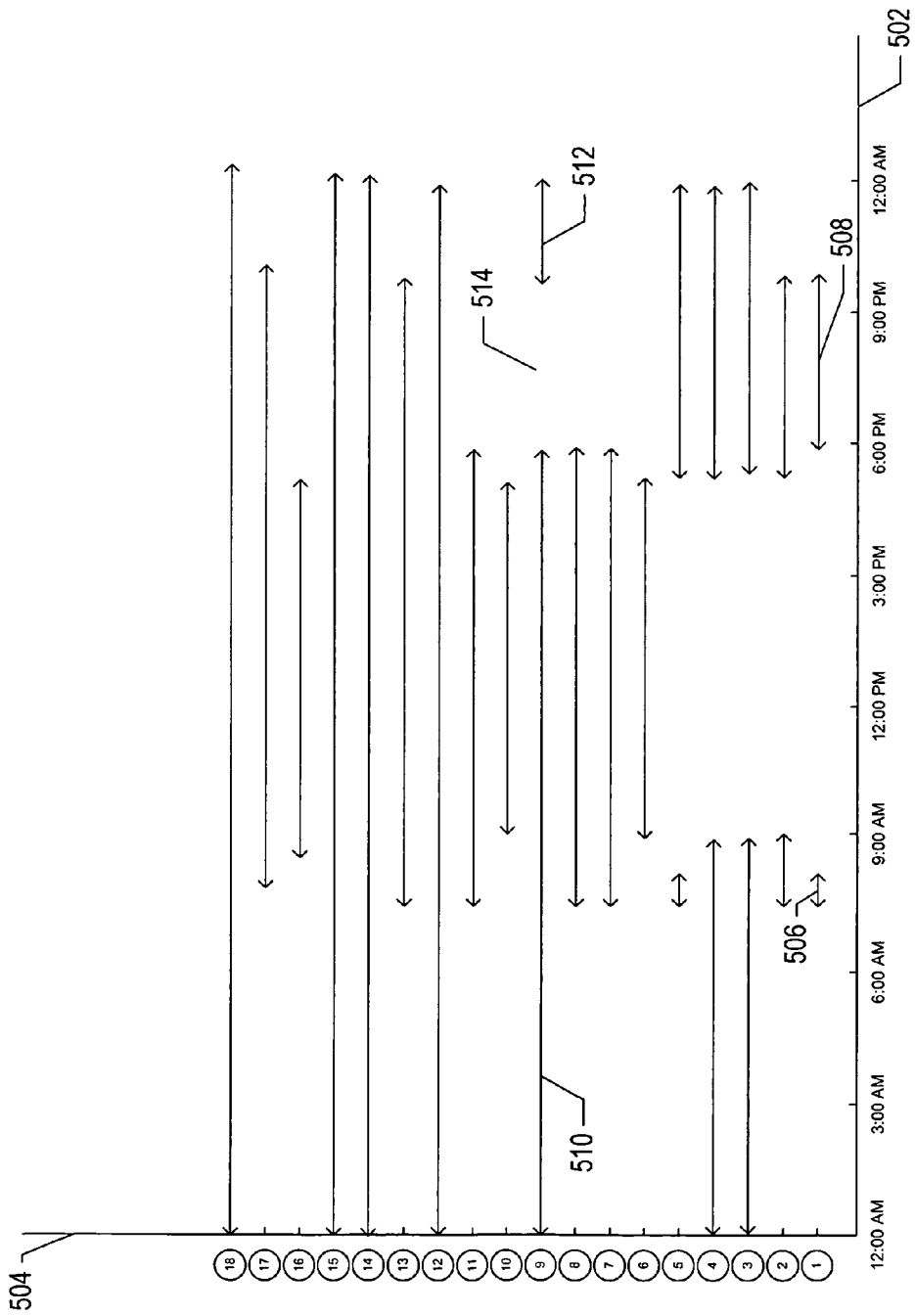
FIG. 5 illustrates, as an example, a time-of-day dimension of intra-organizational communications complexity.

There are, however, many more dimensions to the complexity of modern communications than the number and types of communications media and devices through which members of an organization can be reached. FIG. 5 illustrates, as an example, a time-of-day dimension of intra-organizational communications complexity. In FIG. 5, the availability of each of the different communications medium/devices shown in FIG. 4 for the company president is plotted with respect to time of day. In FIG. 5, the time of day is represented by the horizontal axis 502 and the availability for each communications medium/device is plotted along vertical axis 504. Double-headed arrows show the availability of the company president through a particular communications medium/device at each point during the day. For example, the company president can be reached by home landline telephone for a short period in the morning 506 and a somewhat longer period 508 in the evening. By contrast, the president can be reached by office email throughout most of the day 510 and 512, although with delays during late evenings and early mornings, with the exception of a period in the evening 514 during which the company president would be more effectively reached by home telephone, home email, or by other means. Not only does a member of the organization seeking to transmit information to another member of the organization need to consider which communications medium and device or communications media and devices through which to transmit the information, the member of the organization also needs to consider which of the communications media and devices are most appropriate for any particular time of day, particularly when timely receipt of the information by the recipient is important.

Figure 6:
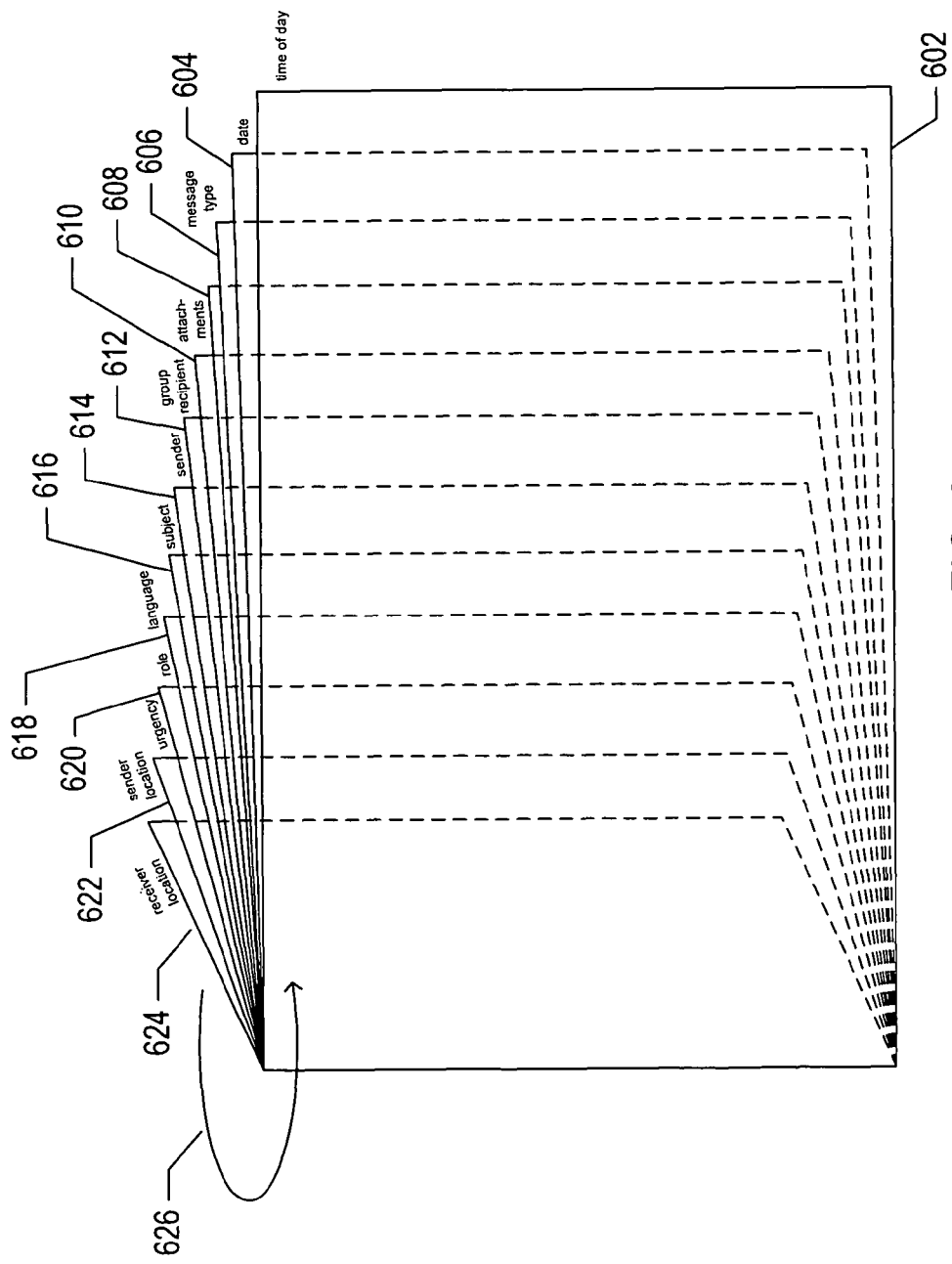
FIG. 6 illustrates additional dimensions of intra-organizational communications complexity.

However, even the added complexity of time-of-day considerations is relatively slight compared to the overall complexity of current intra-organizational communications. FIG. 6 illustrates additional dimensions of intra-organizational communications complexity. In FIG. 6, each of the various dimensions, or considerations, for transmitting information to one or more members of an organization is represented as a two-dimensional plane, such as the two-dimensional plane 602 representing the time-of-day consideration discussed above with reference to FIG. 5. Similar, complex considerations for selecting a communications medium and device or communications media and devices include considerations with respect to: (1) the date 604; (2) the type of message or communications to be transmitted 606; (3) the presence of and nature of, any types of attachments to the message, such as photographs, spreadsheet data, and other such attachments 608; (4) the nature of the group of recipients to which the information is to be transmitted 610; (5) various characteristics and parameters associated with the sender of the information 612; (6) the subject matter of the information to be transmitted 614; (7) the native language in which the information is presented 616; (8) the role of the sender with respect to the organization 618; (9) the urgency with which the information needs to be delivered 620; (10) the location of the sender 622; (11) the location of the intended recipient or recipients of the information 624; and (12) many other such considerations, as represented by curved arrow 626. In essence, the choice of which communications medium and device to use to send or exchange information within an organization may be profoundly complicated, and involve a very difficult, hyper-dimensional optimization task. Clearly, no member of an organization can possibly make even near-optimal decisions for choosing communications media and devices for distributing information to a group of members within an organization.

Figure 7:
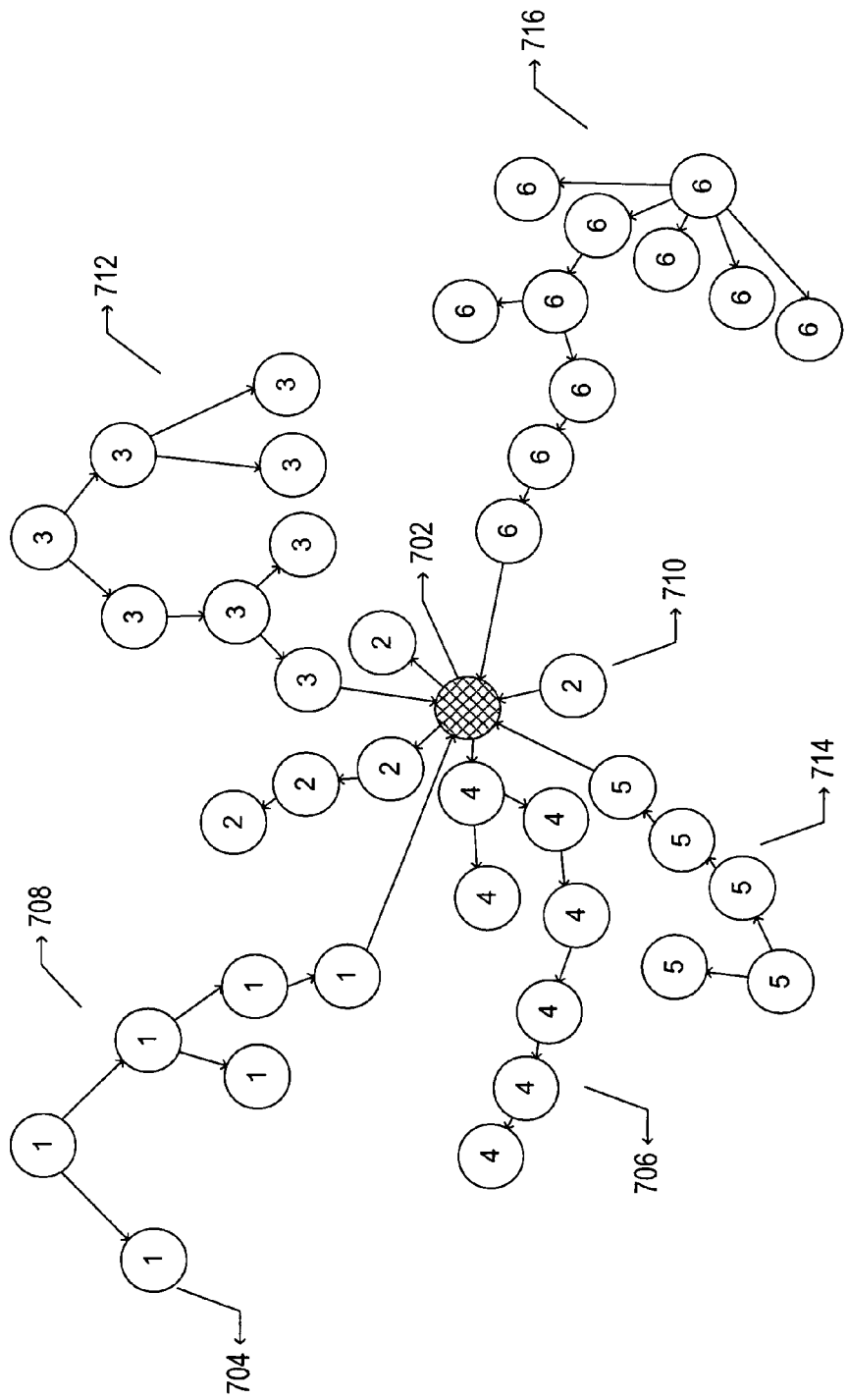
FIG. 7 shows an example organization chart for a small organization with respect to a particular member of the organization.

Another aspect of the difficulty of intra-organization communications in current organization environments is the fact that, unlike in traditional organizations, as discussed above with reference to FIG. 2, the structure of modern organizations tends to be far more complex and dynamic. FIG. 7 shows an example organization chart for a small organization with respect to a particular member of the organization. The particular member of the organization is represented by a cross-hatched disk 702, and other members of the organization are represented by numerically labeled disks, such as disk 704, with the numerical label referring to a particular group of members. Members of the organization may be represented by multiple disks in FIG. 7, other than the particular member 702. As shown in FIG. 7, the particular member of the organization 702 is a member of each of six different hierarchical groups within the organization. The particular member is the head, or root-node member, of group 4 (706 in FIG. 7) and occupies various intermediate positions within each of groups 1 (708 in FIG. 7), 2 (710 in FIG. 7), 3 (712 in FIG. 7), 5 (714 in FIG. 7), and 6 (716 in FIG. 7). Were the president to decide to distribute an announcement to a particular group of members of the organization, it would be difficult for any member of the organization to determine to which particular members of the organization the information should be distributed. First, there are many different overlapping groups, as in the example shown in FIG. 7, so that many different lists of members of the organization would need to be maintained. Moreover, in modern organizations, the membership in the various groups tends to change quite rapidly, and new groups may be constantly formed and current groups removed with relatively high frequency.

Consider the complexity of the first information-distribution scenario discussed above with reference to FIG. 3. In the first step, the company president 302 would need to make a relatively complex decision with regard to possible trade-offs in distributing the message or announcement through different communications media and devices. Or, not wishing to undertake such a complex task, the company president may instead direct the administrator 306 to distribute a particular announcement to the members of a particular group under various time-of-delivery and other constraints. The administrator would need to first determine who the members of the group are and then, for each member, consider all the possible different communications media and devices by which the member can receive information and attempt to select the most appropriate communications medium and device or communications media and devices for the member with respect to the form of the announcement and many other considerations. The task would clearly be overwhelming, particular when requested frequently with respect to different types of information and groups.

In many cases, features and capabilities of modern communications technologies may somewhat collapse the problem space discussed above with reference to FIGS. 4-7, but they do not systematically and efficiently collapse the problem domain to a point of feasibility. For example, it is currently possible to link different types of devices to one another so that a message sent to one device is automatically forwarded to others. However, problems remain. As one example, one may wish to distribute a fairly complex, lengthy text message with additional attachments, including photographs. Such information may be readily transmitted via Internet-based email, but it is essentially impossible using instant messaging or text messaging. Therefore, even though a member not able to directly receive the email message might receive indications that the email message was sent, via instant messaging or text messaging, the member would still not receive the information that is intended to be distributed to the member. As another example, modern database technology can provide relatively easily administered and accessed listings of the members of each of the groups within an organization. However, even with such systems at hand, it may nonetheless be time-consuming and annoying to access such lists in order to transmit information. In certain cases, communications media and devices provide for automatic transmission of information to groups of members within an organization. For example, many email applications allow users to create or import named lists of members so that an email can be sent to each member of the list in one operation. However, the email-listing feature may still require time-consuming and expensive administration, on an organization-wide level, and does not address the many other dimensions of intra-organization communication complexities. Furthermore, such disparate technical features, when employed in an organization, may lead to security breaches and other opportunities for misuse or mischief. Because of the number of different types of communications media and devices through which each member of an organization may receive messages and other information, and the relatively high frequency at which new communications media and devices may become available for a particular member, and existing communications media and devices may, as a result, become less desirable or even no longer available, centrally managing even the member contact information may represent a formidably complex problem. A centralized repository for contact information is needed, but, at the same time, centralized collection and management of this information may represent an enormous cost and time burden to the organization.

Figure 8A:
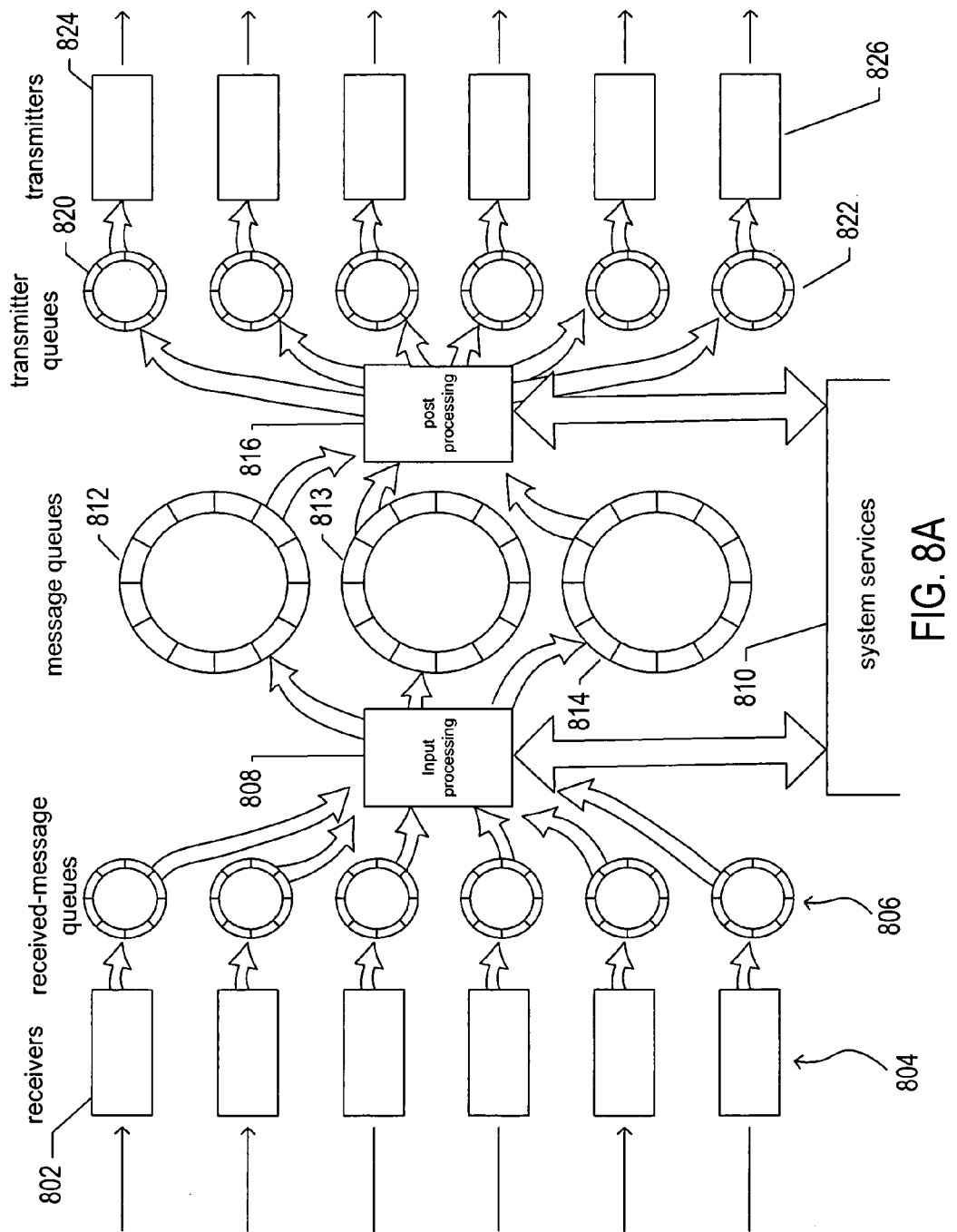
FIGS. 8A-B illustrate, at a schematic level, an automated communications system to which the current application is, in part, directed.
Figure 8B:
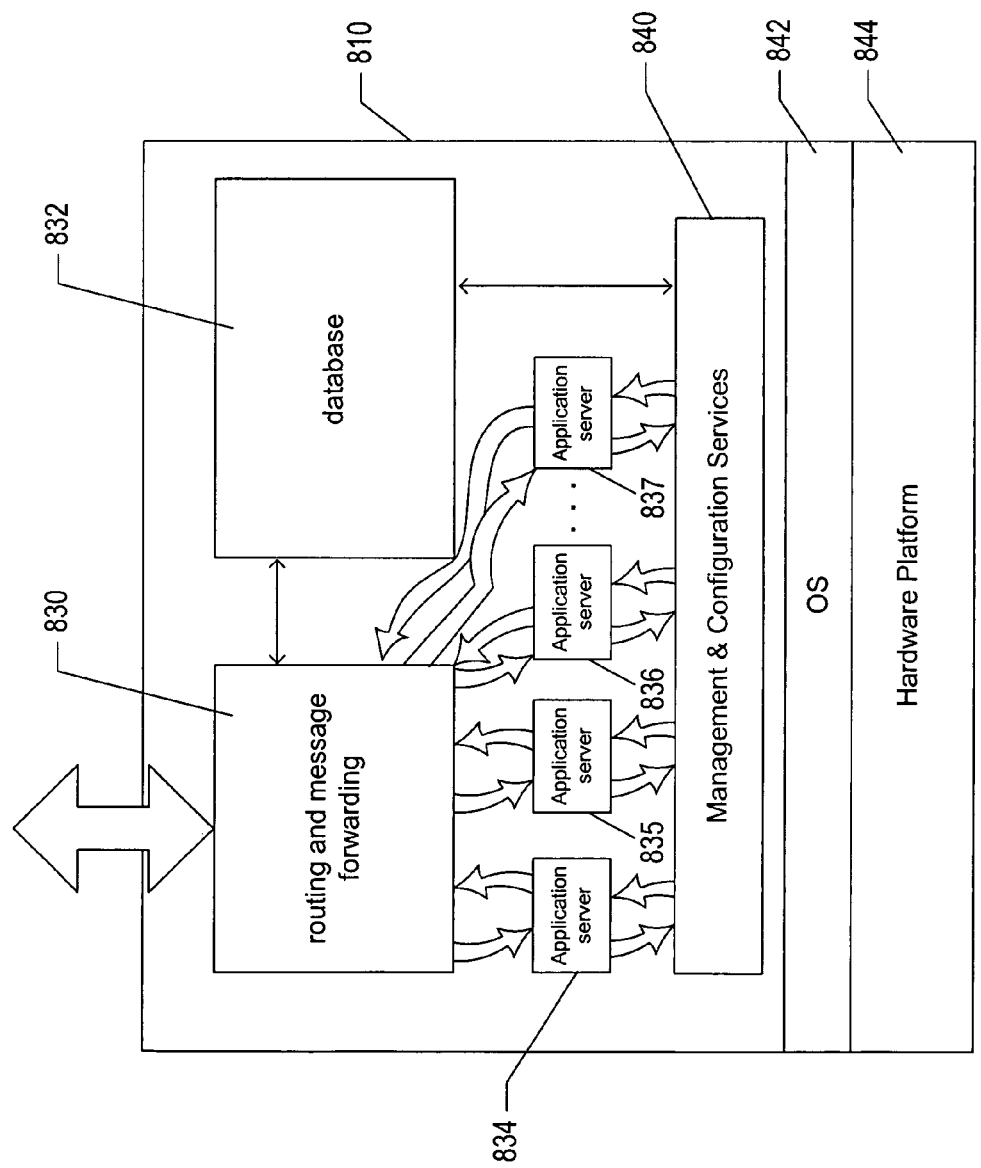

To address the above-described problems with current intra-organization communications, and many additional problems, the current application provides for flexible, easily administrated, and easily monitored automated systems for interconnecting members of an organization through any of many different communications media and devices. FIGS. 8A-B illustrate, at a schematic level, an automated communications system to which the current application is, in part, directed. The automated system to which the current application is, in part, directed includes a large number of different types of communications receivers, such as receiver 802 in a column of receivers 804 shown on the left side of FIG. 8A. The messages or other types of information received through these receivers are queued to received-message queues, shown in a column of received-message queues 806 in FIG. 8A. There is at least one received-message queue paired with each receiver. Received messages are de-queued from the received-message queues and processed by an input-processing component or subsystem 808. The input-processing subsystem 808 accesses various system services through interfaces provided by a system-services component 810 discussed below with reference to FIG. 8B. Once the received messages have been processed by the input-processing subsystem 808, corresponding messages for forwarding to other users and/or reply messages are queued to one or more internal message queues 812-814. Subsequently, a post-processing subsystem 816 de-queues messages from the internal message queues 812-814, processes these messages, and queues fully processed messages corresponding to messages queued to the internal message queues to transmitter queues, such as transmitter queue 820 in a column of transmitter queues 822 shown on the right side of FIG. 8A, from which the messages for transmission are de-queued and transmitted by transmitters, such as transmitter 824 in the column of transmitters 826 shown in FIG. 8A.

The receivers 804 can be any type of communications receiver, including, as examples, simple-mail-transport-protocol ("SMTP") servers connected to the Internet, voice-communications servers and modems connected to public switched telephone networks ("PSTN"), extensible-messaging-and-presence protocol ("XMPP") servers connected to the Internet, short message peer-to-peer protocol ("SMPP") servers connected to the Internet, hypertext transport protocol ("HTTP") servers connected to the Internet, transmission-control-protocol/Internet-protocol ("TCP/IP") servers connected to the Internet, and other types of message-receiving servers interconnected to wireless communications receivers, LAN devices, or other appropriate communications media. Similarly, the transmitters may be any of a wide variety of different types of transmission devices, including the various types of servers associated with physical transmission devices connected to appropriate communications media. In many cases, although the receivers and transmitters are shown as separate components in FIG. 8, the receivers and transmitters may instead be collocated within a transceiver-type component, such as an SMPP server connected to a public telephone network that both receives and transmits SMS messages. The various receivers, transmitters, and transceivers can receive and transmit many different types of messages and information, including text-based email, extensible-mark-up-language ("XML")-encoded messages and information, instant-messaging messages, multipurpose-Internet-mail-extensions ("MIME") documents, multimedia-messaging-service ("MMS") messages, and even telemetry communications between various types of devices and systems via machine-to-machine ("M2M") communications. The automated communications system to which the current application is, in part, directed can be, at a high level, considered to be a very high-bandwidth, intelligent, queue-based communications crossbar that receives messages and other information from a variety of different information sources, including from users of the automated communications system, processes these messages according to internally stored and managed information, and either forwards the messages or transmits reply messages to a large number of different types of information sinks. The above-mentioned types of messages and other information, communications media, and protocols are examples, but are not intended to, in any way, constrain the types of messages and other information, communications media, and protocols that are supported by automated communications systems to which the current application is, in part, directed. Automated communications systems to which the current application is, in part, directed are generally designed and implemented to allow for straightforward inclusion and adaption to receiving, transmitting, and processing of any type of information by any communications medium and protocol. Automated communications systems to which the current application is, in part, directed therefore provide a full crossbar-like interconnection between each and every communications medium, protocol, and device supported by the automated communications systems. As discussed below, it may be necessary for messages and other information received from a first communications medium according to a first protocol to be processed and adapted for transmission to a second communications medium according to a second protocol. This processing and adaptation may result in a loss of information, due to incompatibilities of certain devices, media, and protocols to transmit and/or receive certain types of messages and information. However, even when the content of a message cannot be forwarded from a first communications medium/device to a second communications device/medium, the fact that the information has been sent can generally be transmitted, so that a user or member is notified to receive the information on another of the user's compatible devices.

FIG. 8B shows the systems services component 810 briefly mention with respect to FIG. 8A. The systems services component 810 is a computational component that resides in, and executes on, one or more computational platforms, such as servers, distributed computer systems, and other such computational platforms. The system services component includes a routing-and-message-forwarding subsystem 830, a database and database interface 832, a number of application servers 834-837, and a management-and-configuration-services subsystem 840. All of these subsystems and application servers execute within an execution environment provided by one or more operating systems 842 that interface to one or more hardware platforms 844.

The database and database interface subsystem (832 in FIG. 8B) contains a large amount of information with regard to organizations, the structures of organizations, members within organizations, communications media and devices, and many other types of stored information that allow for operation of the complex communications crossbar discussed above with reference to FIG. 8A. FIG. 9 illustrates certain types of stored data that represent organizations and organizational structures according to the current application. The database contains one or more table entries or records for each organization for which intra-organizational communications is provided by the automated system, such as record 902. Similarly, the database contains records or table entries that represent groups of members within organizations, such as the group data structure 904 in FIG. 9. Finally, each user or member of the organization for which communications are provided by the automated communications system is represented by a data structure, such as data structure 906 in FIG. 9. These data structures, like those that represent organizations and groups, may be composed of one or more records or a number of rows in various different relational-database tables. In addition, the database stores various mappings between these entities. A first mapping 908 can be implemented in the form of a table, each entry or row of which associates a group data structure with an organization data structure. For example, the first entry in the table 910 associates the organization data structure 912 with group data structure 914. This first mapping table 908 thus associates each group data structure with an organization to which the group belongs. A second, similar mapping table 916 maps users to particular groups. There may be many additional such mapping tables. For example, an additional mapping table may directly map users to organizations, although this table is not strictly necessary, since the same information may be obtained from mapping tables 908 and 916. Another mapping table 920 shown in FIG. 9 maps groups to one another. This mapping table serves to organize groups into hierarchical group structures. In one implementation, each entry in the table, such as entry 922, represents a parent-child relationship between two groups. Entry 922, for example, represents the fact that group data structure 914 is the parent of group data structure 924 in a hierarchy of groups.

Figure 10:
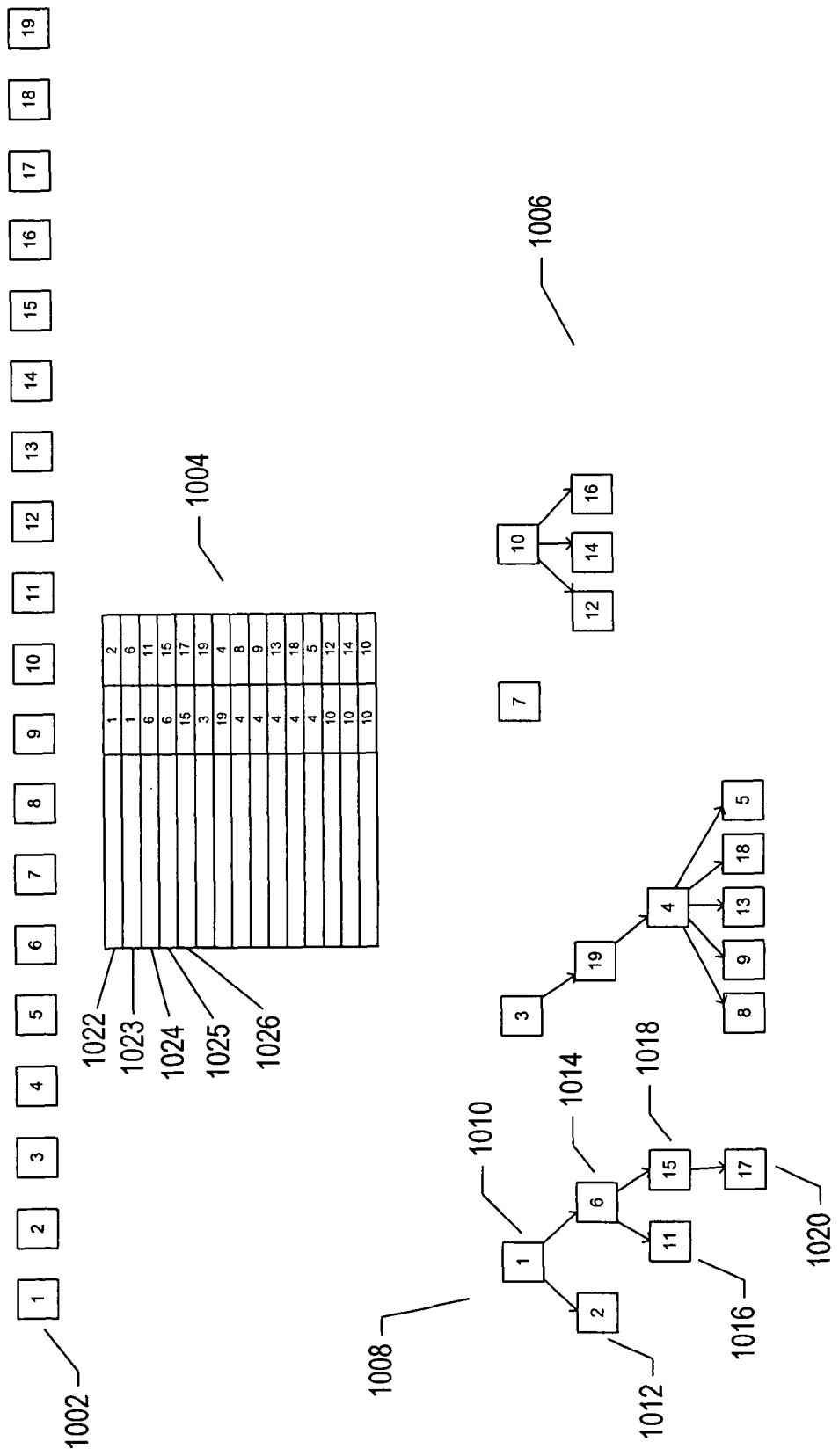
FIG. 10 illustrates, in more detail, the mapping of groups into group hierarchies within data stored in a database subsystem of an automated communications system to which the current application is, in part, directed.
Figure 11:
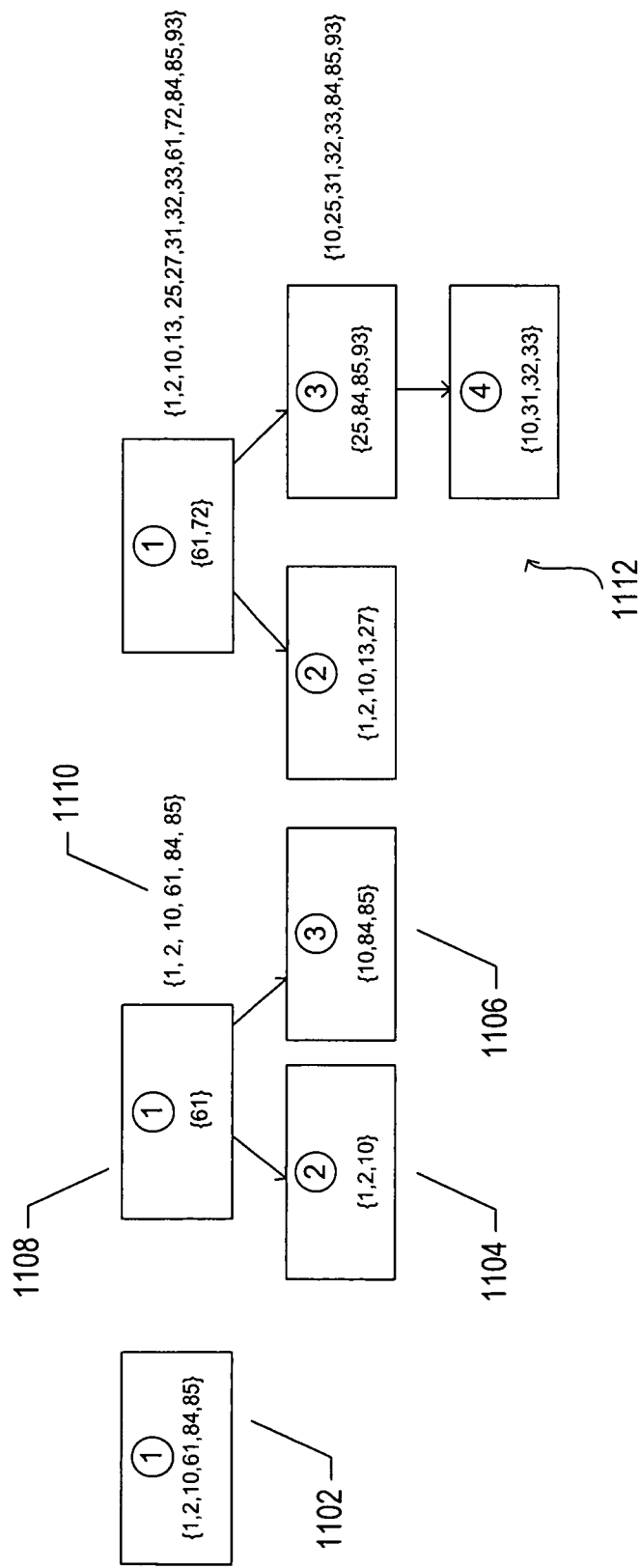
FIG. 11 illustrates hierarchical group structures that may be used to define complex structural features of an organization within data stored in a database sub-system of an automated communications system to which the current application is, in part, directed.

FIG. 10 illustrates, in more detail, the mapping of groups into group hierarchies within data stored in a database sub-system of an automated communications system to which the current application is, in part, directed. In FIG. 10, 19 group data structures are shown in a horizontal row of group data structures 1002 at the top of FIG. 10, each group data structure including a numerical group number. Mapping table 1004 contains entries, each of which represents a parent-child relationship between two groups. The logical organization of groups into group hierarchies represented by the entries of the table 1004 is shown in a bottom row of group hierarchies 1006 in FIG. 10. Thus, a first group hierarchy 1008 includes a broadest or root group 1010 composed of two subgroups 1012 and 1014, the latter of which is in turn composed of two subgroups 1016 and 1018, the latter of which contains an additional subgroup 1020. This hierarchical group structure is represented, in table 1004, by entries 1022-1026. FIG. 11 illustrates hierarchical group structures that may be used to define complex structural features of an organization within data stored in a database sub-system of an automated communications system to which the current application is, in part, directed. As shown in FIG. 11, hierarchical group structures may be used to define complex structural features of an organization. Furthermore, these hierarchical groups structures may be modified, or evolve, over time. For example, in FIG. 11, a first single-group group structure is formed that includes the set of members identified by the set of numerical member identifiers {1, 2, 10, 61, 84, and 85} 1102. Later, it may be decided to form two subgroups 1104 and 1106 within the group, and distribute a portion of the original members of the group between the subgroups and the highest-level group 1108. The highest-level group is considered to include all of the members explicitly associated with the highest-level group and any ancestor within the group hierarchy, as shown in set notation 1110 to the right of the highest-level group node. Addition of more members and a subgroup of one of the initial subgroups leads to the group hierarchy 1112 shown to the right of FIG. 11. In alternative implementations, different types of group structures may be defined.

Creation, modification, and deletion of groups, as well as the addition and deletion of members from organizations, and many other such management and configuration tasks are carried out by the management-and-configuration-services subsystem (840 in FIG. 8B). The management-and-configuration-services subsystem provides a management-and-configuration interface, through each of the various application servers, to users of the automated system to enable the users to create, modify, and delete members and groups of members with respect to the organizations to which they belong. In many communications systems to which the current application is, in part, directed, the particular management-and-configuration interface provided to a user may depend on access rights and privileges granted to the user by administrative or management users associated with organizations and groups within organizations. The application servers provide suitable formatting and presentation for each of the various types of communications-medium/device-type combinations supported by the automated communications system, as well as message-sending and message-receiving user interfaces that allow users to create and send various types of messages to individual users or groups of users within an organization.

An enormous advantage to organization to which communications services are provided by automated communications systems to which the current application is, in part, directed is that the information needed to transfer messages and information to each member of an organization is stored in a logically centralized database. This ameliorates and, in many cases, entirely removes the otherwise burdensome task of managing contact information and other information needed for exchange of information between members of an organization from the organization. The information is, of course, always available for inspection, editing, and other management operations through the management and configuration interfaces provided through various application servers to members of the organization by automated communications systems to which the current application is, in part, directed. An addition, the information can be largely entered into the system and updated as needed by individual members of the organization, rather than being collected from members and then entered by an administrator or other party. Because of the rapidly changing nature of modern communications, individual members are best positioned to ensure that their contact and other information is entered and updated to provide efficient and effective information flow. Furthermore, by providing members with the ability to specify communications devices and various parameters and constraints associated with receiving information through them, an organization can avoid the often difficult task of establishing and enforcing relatively inflexible and burdensome policies on members of the organization, although automated communications systems to which the current application is, in part, directed do support specification and distribution of intra-organizational communications policies to members, when needed and desired.

Figure 12:
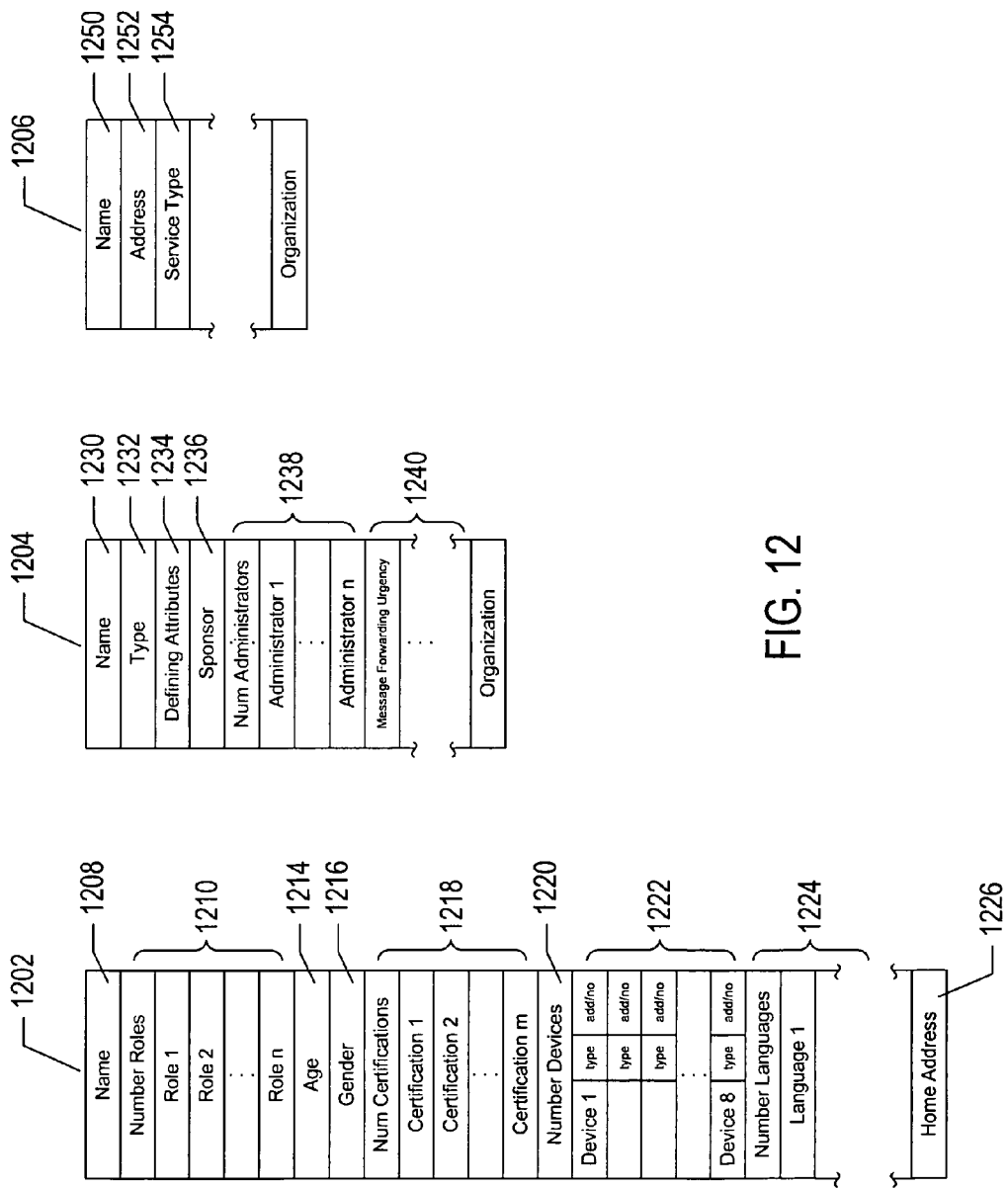
FIG. 12 illustrates portions of the fundamental data structures stored within the database and database-interface subsystem of an automated communications system to which the current application is, in part, directed.

FIG. 12 illustrates portions of the fundamental data structures stored within the database and database-interface subsystem of an automated communications system to which the current application is, in part, directed. FIG. 12 provides an example user or member data structure 1202, an example group data structure 1204, and an example organization data structure 1206. These data structures may be composed one or more records or one or more different entries in one or more different relational tables within various different types of databases. The example data structure shown in FIG. 12 is intended to illustrate only a portion of the various types of information that may be collected and stored for users, groups, and organizations. In FIG. 12, for example, the user data structure includes many different types of information to characterize a particular user, including the user's name 1208, the number of roles and indication of the types of roles performed by the user within the organization 1210, the user's age 1214, the user's gender 1216, the number of certifications and indications of which certifications are held by the user 1218, the number of communications devices through which the user can receive and transmit information to other members of the organization 1220 and a detailed list of those devices, device types, their addresses, and other information regarding the communications devices used by the user 1222, an indication of the languages with which the user can communicate 1224, and the user's home address 1226. Clearly, these are only but a few examples of the many different types of information that can be collected and stored to characterize users or members of an organization, which may additionally include one or more numeric identifiers for the user, various types of user preferences, and other such information. Similarly, a group may be associated with a group name 1230, a group type 1232, attributes the define the criteria for membership in the group 1234, a group sponsor 1236, the number of users with administrative privileges with respect to the group 1238, and various characteristics for information exchanged among group members 1240. Again, there are many additional types of information that can be collected and stored to characterize groups, including numeric group identifiers, various communications addresses associated with groups, and other such information. Similarly, an organization may be described by the organization's name 1250, address 1252, the service type provided by the communications system to the organization 1254, and many other different types of information.

Figure 13:
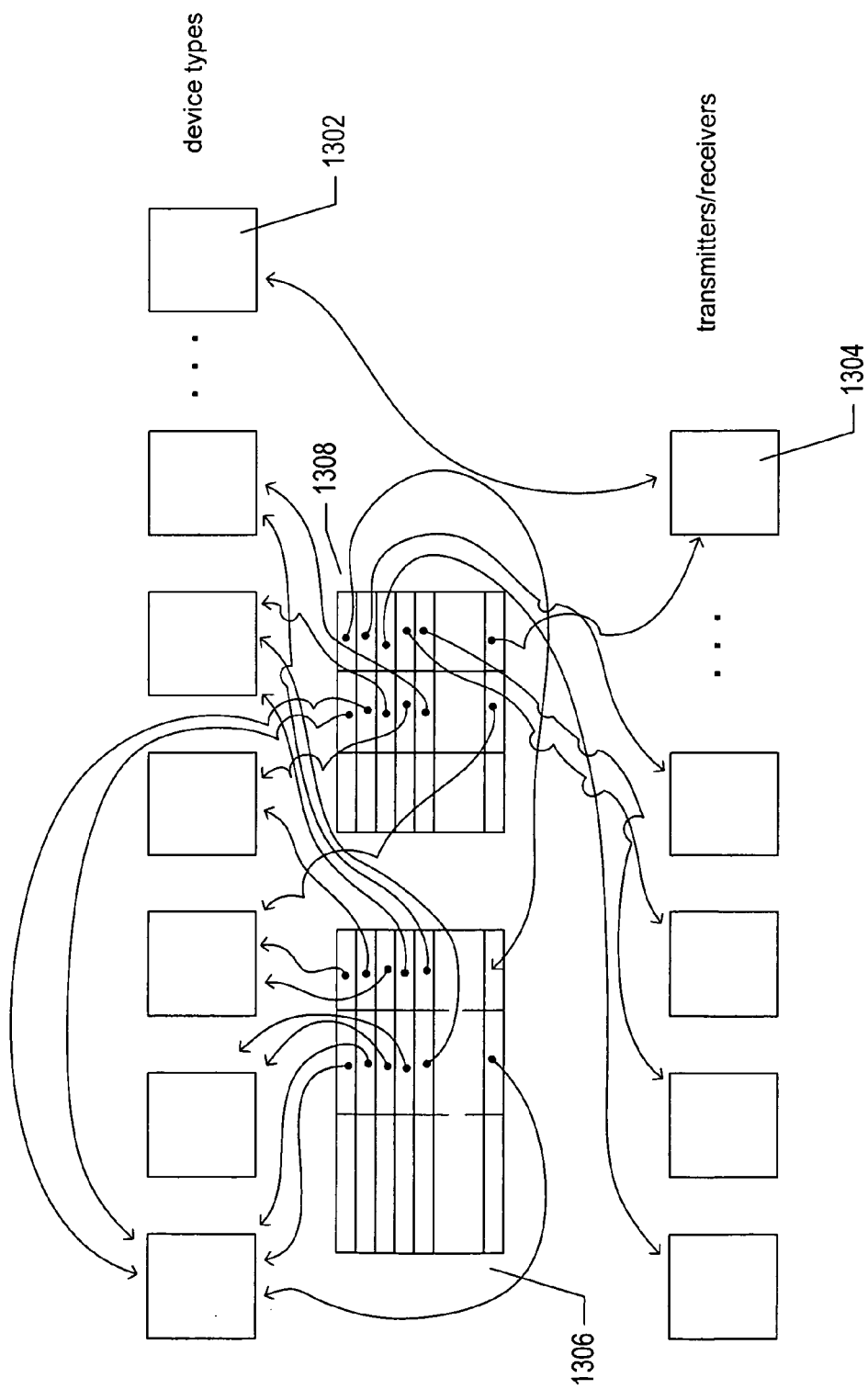
FIG. 13 illustrates additional device-type and communications-media information stored by the database and database-interface subsystem of an automated communication system to which the current application is, in part, directed.

The database and database-interface subsystem (832 in FIG. 8B) additionally contains stored data that describes device types and the various types of communication media through which the automated communications system can receive and transmit messages and other information. FIG. 13 illustrates additional device-type and communications-media information stored by the database and database-interface subsystem of an automated communication system to which the current application is, in part, directed. As shown in FIG. 13, the database and database-interface subsystem may include a data structure for each of the different types of communications devices and associated protocols supported by the system, such as device-type data structure 1302. Similarly, the database and database-interface subsystem of an automated communications system to which the current application is, in part, directed may store data structures, each of which represents a receiver, transmitter, or transceiver for a communications medium included within the automated communications system, such as data structure 1304. In addition, the database and database-interface subsystem stores various mapping tables, such as a mapping table 1306 that maps device types to one another to indicate the device types that are compatible or can receive and transmit information to one another via the automated communications system and mapping table 1308 that associates device types and protocols with receivers, transmitters, and transceivers and associated with communications media that can be accessed and used by the device types.

The database and database-interface subsystem (832 in FIG. 8B) of the automated communications system to which the current application is, in part, directed additionally stores log information describing information exchanges between users as well as interaction of users with the configuration-and-management interfaces provided to users by the automated communications system. The management-and-configuration subsystem provides, through each of various application services, an interface to appropriately privileged users to allow the users to search for, list, and view the contents of historical records of the messages transmitted from one user to another, as well as the commands issued by users to the configuration and management subsystem. Unlike in many organizations today, the automated communications system to which the current application is, in part, directed therefore provides a detailed record of intra-organizational information transfer and communications regardless of which communications media and communications devices the information was transferred through. This logging feature can be used to recover lost information, verify information transmission at subsequent points in time, and provide useful records for various regulatory management activities within the organization.

Figure 14:
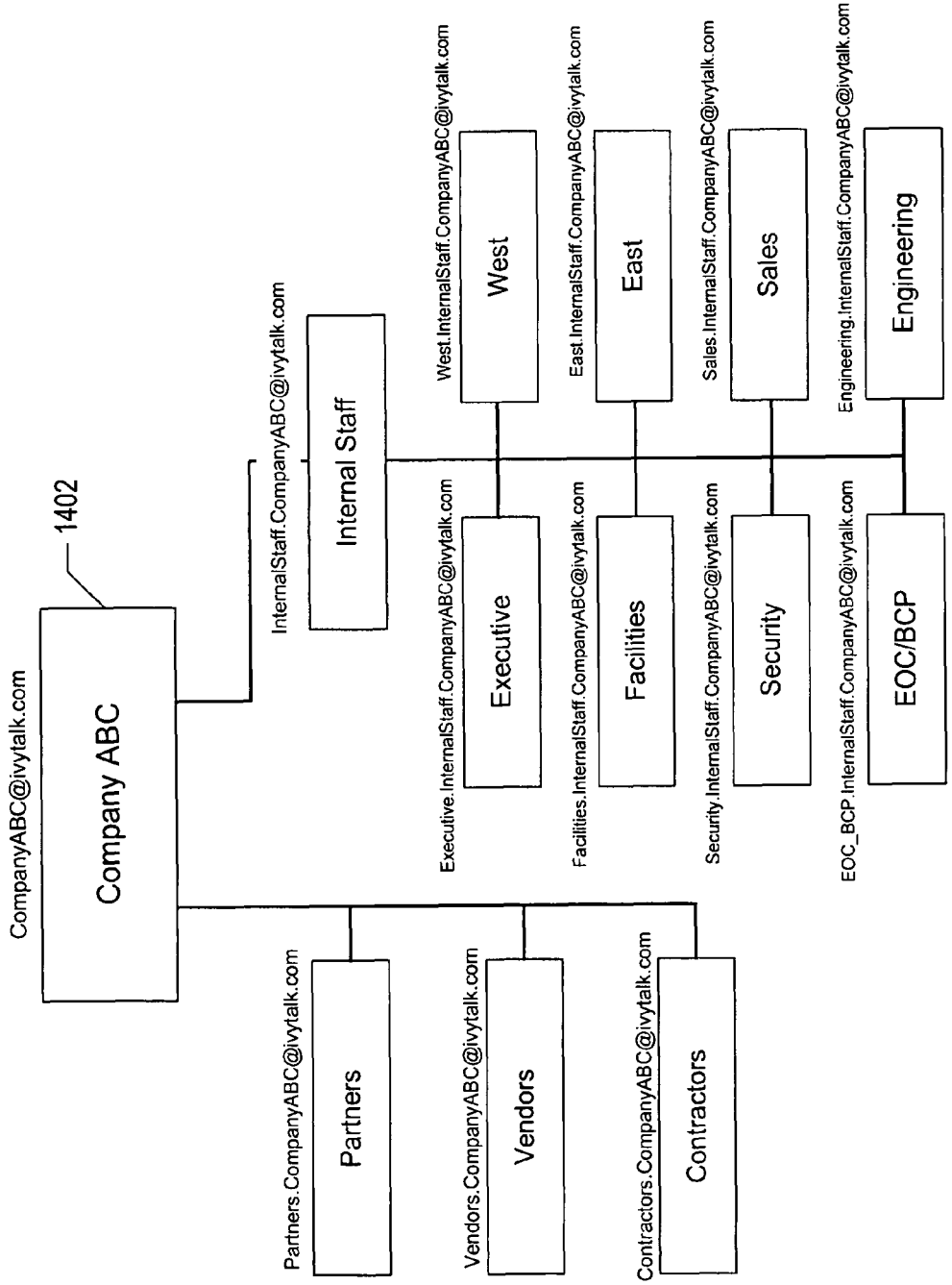
FIG. 14 illustrates a hierarchical group structure for an organization for which intra-organizational communications is provided along with an associated addressing scheme that allows users to transmit messages and other information into the automated communications system for distribution by the automated communications system to other members of the organization.

There are many different ways by which the automated communications system to which the current application is, in part, directed can be accessed by users. In many implementations, simple, efficient, and low-overhead methods are used for routing messages from user devices into the automated communications system. FIG. 14 illustrates a hierarchical group structure for an organization for which intra-organizational communications is provided along with an associated addressing scheme that allows users to transmit messages and other information into the automated communications system for distribution by the automated communications system to other members of the organization. In FIG. 14, the structural organization for company ABC is shown, including a root node 1402, or overall group, and a variety of hierarchically arranged subgroups. In FIG. 14, an email address that can be used by a user to send an email to all of the members of a particular group or subgroups is shown above each node in the hierarchical group structure. In this scheme, like pathnames for files within a hierarchical file system, a particular group or subgroup is specified by a list of subgroup and group names, separated by "." characters, in lowest-level-to-highest-level order, representing a path to the particular group or subgroup in the hierarchical structure. A user need not remember all of these group names, but may instead employ a suitable application-server interface, displayed on the user's device, to view a hierarchical representation of the groups within an organization and select a particular group to which to send a next message. The appropriate email address is then entered as the "To:" address in the email message by the application server. Similar organization and group addressing schemes are used for each of the various other types of communications media and devices supported by an automated communications service to which the current application is, in part, directed. For an example, various groups and subgroups within an organization may be associated with different telephone numbers which a user can call, either directly or through an application-server interface, to distribute voice mails to the members of the group.

Figure 15A:
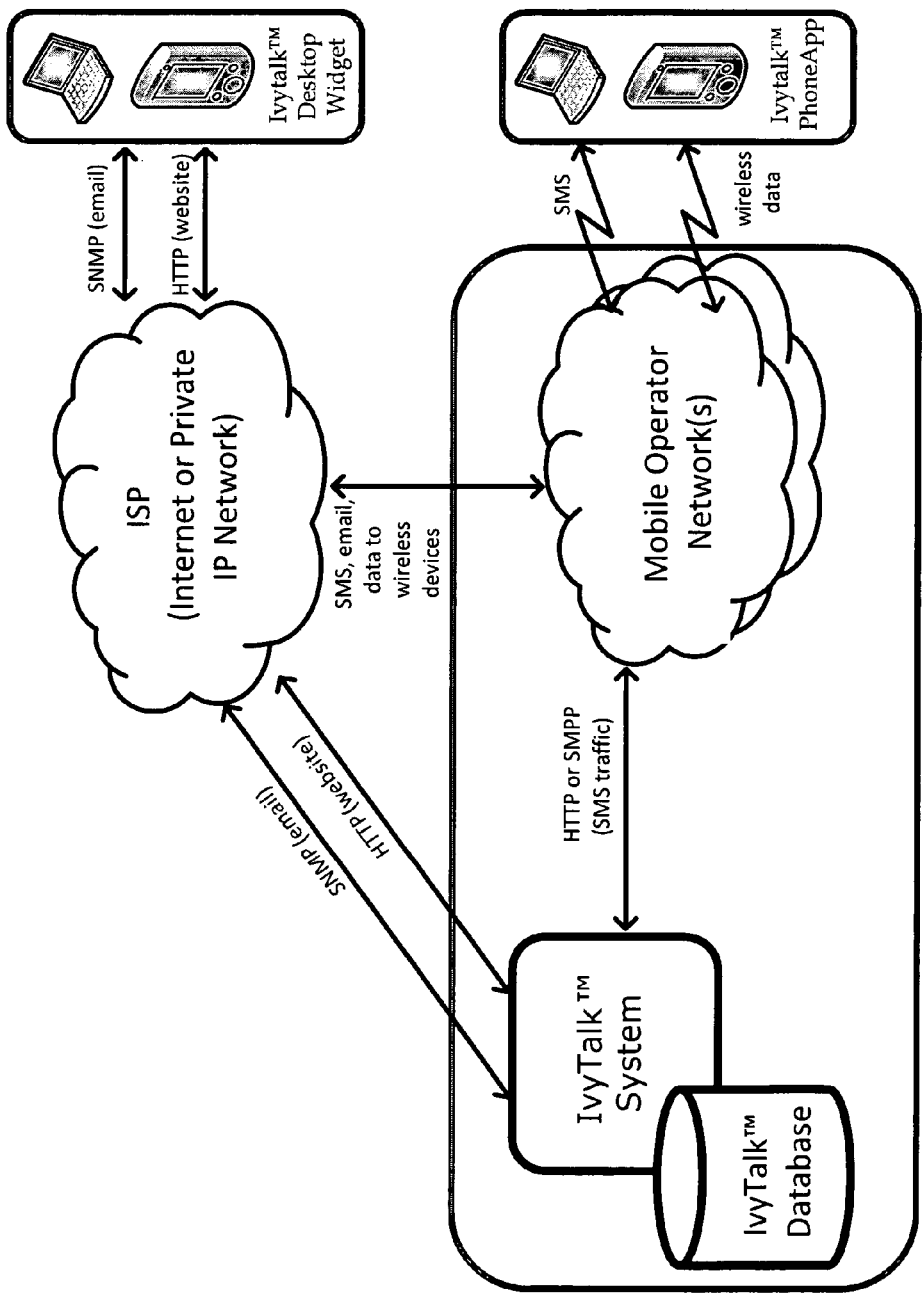
FIGS. 15A-B illustrate two different operational modes for automated communications systems to which the current application is, in part, directed.
Figure 15B:
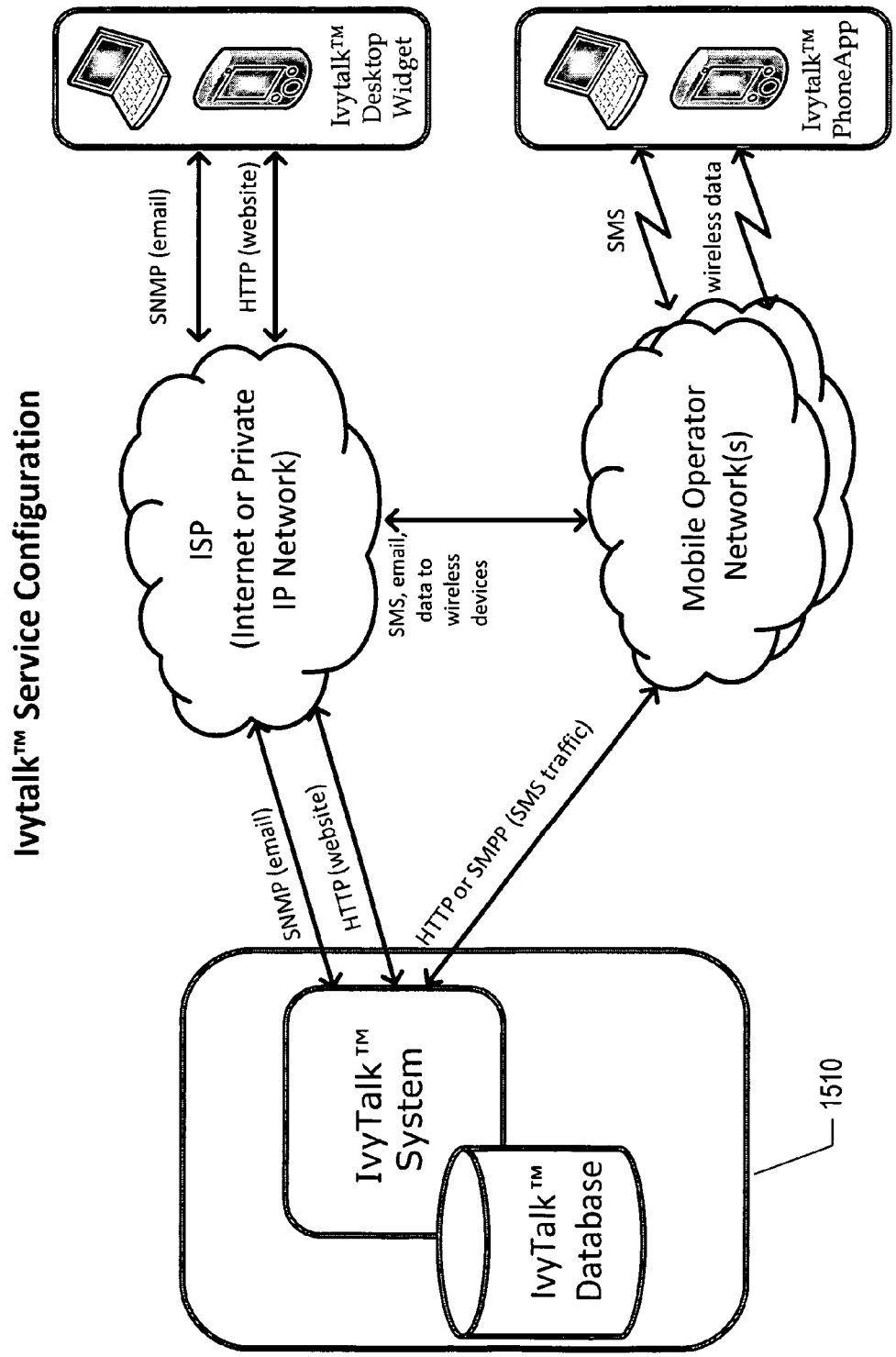

FIGS. 15A-B illustrate two different operational modes for automated communications systems to which the current application is, in part, directed. As shown in FIG. 15A, the automated communications system, including the queue-based communications crossbar and services system shown in FIGS. 8A-B, can reside as a component within a mobile-operator network or mobile-operator networks to provide intra-organizational communications through ISPs and a mobile-operator network interface. Alternatively, as shown in FIG. 15B, the automated intra-organizational communications system to which the current application is, in part, directed may be separate, stand-alone entities and businesses 1510 that provide intra-organizational communications services directly to ISPs and to mobile-operator networks to which user's devices are connected.

Figure 16:
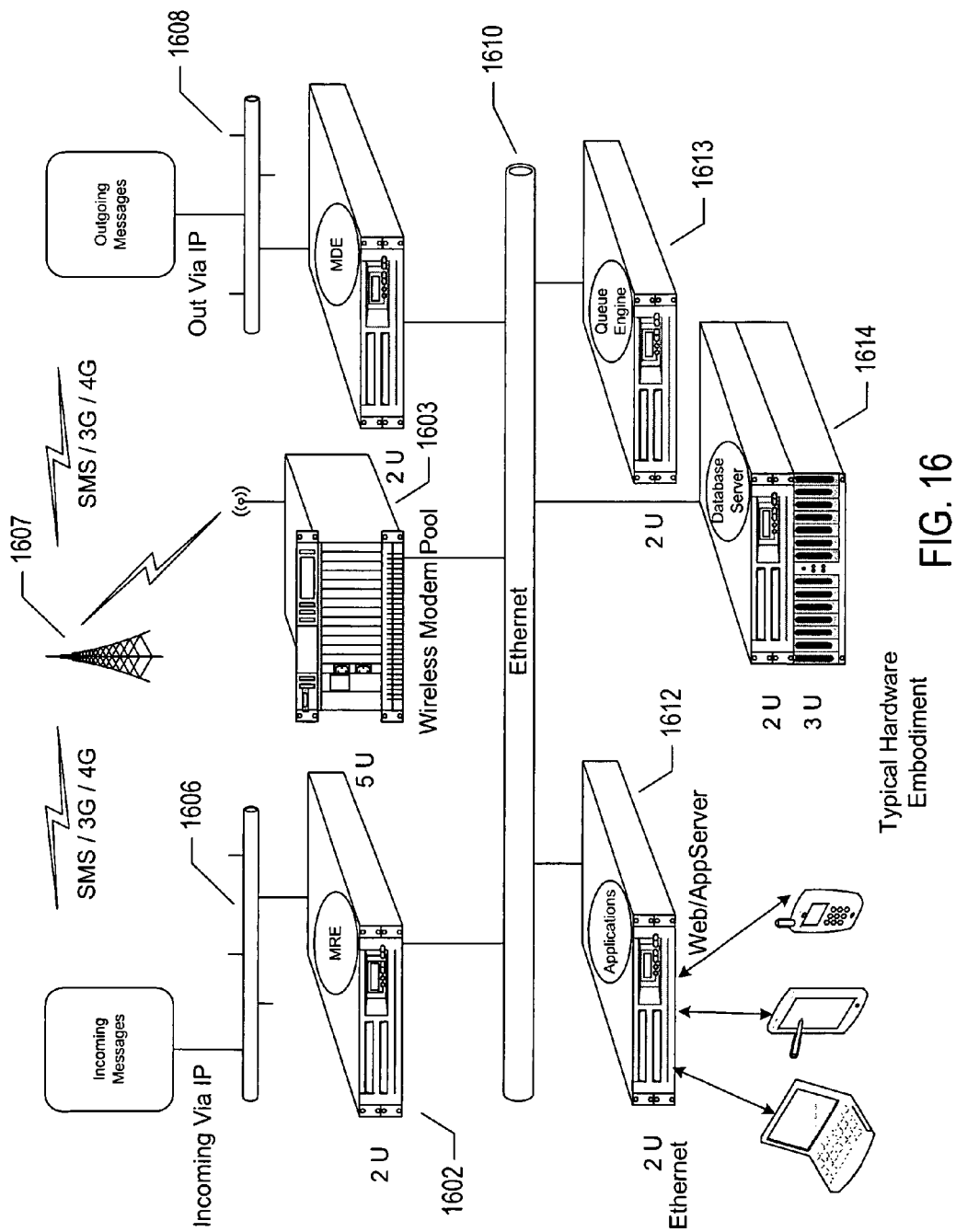
FIG. 16 illustrates a typical hardware platform for an automated communications service to which the current application is, in part, directed.

FIG. 16 illustrates a typical hardware platform for an automated communications service to which the current application is, in part, directed. The platform includes the various transmitters, receivers, and transceivers 1602-1604 for the communications media 1606-1608 supported by the automated communications system. Messages received by these transceivers are transmitted, via a local area network 1610, to servers or other computational platforms 1612-1614 on which the queue-based crossbar system and services components are implemented.

Figure 17:
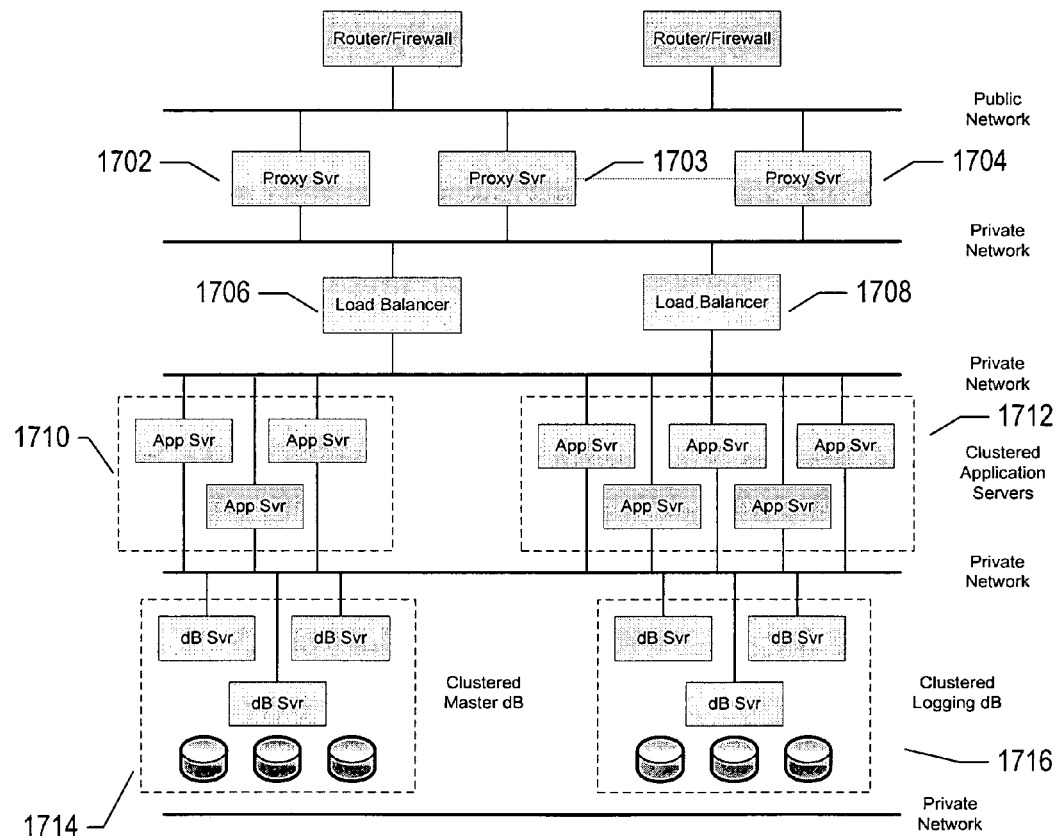
FIG. 17 illustrates a distributed automated communications system to which the current application is, in part, directed.

FIG. 17 illustrates a distributed automated communications system to which the current application is, in part, directed. As shown in FIG. 17, incoming and outgoing messages may be received and transmitted by a number of proxy servers 1702-1704 that forward messages and receive messages, through load-balancing nodes 1706 and 1708, to geographically separate clusters of application servers 1710 and 1712 and geographically separate clustered database engines 1714 and 1716.

Figure 18:
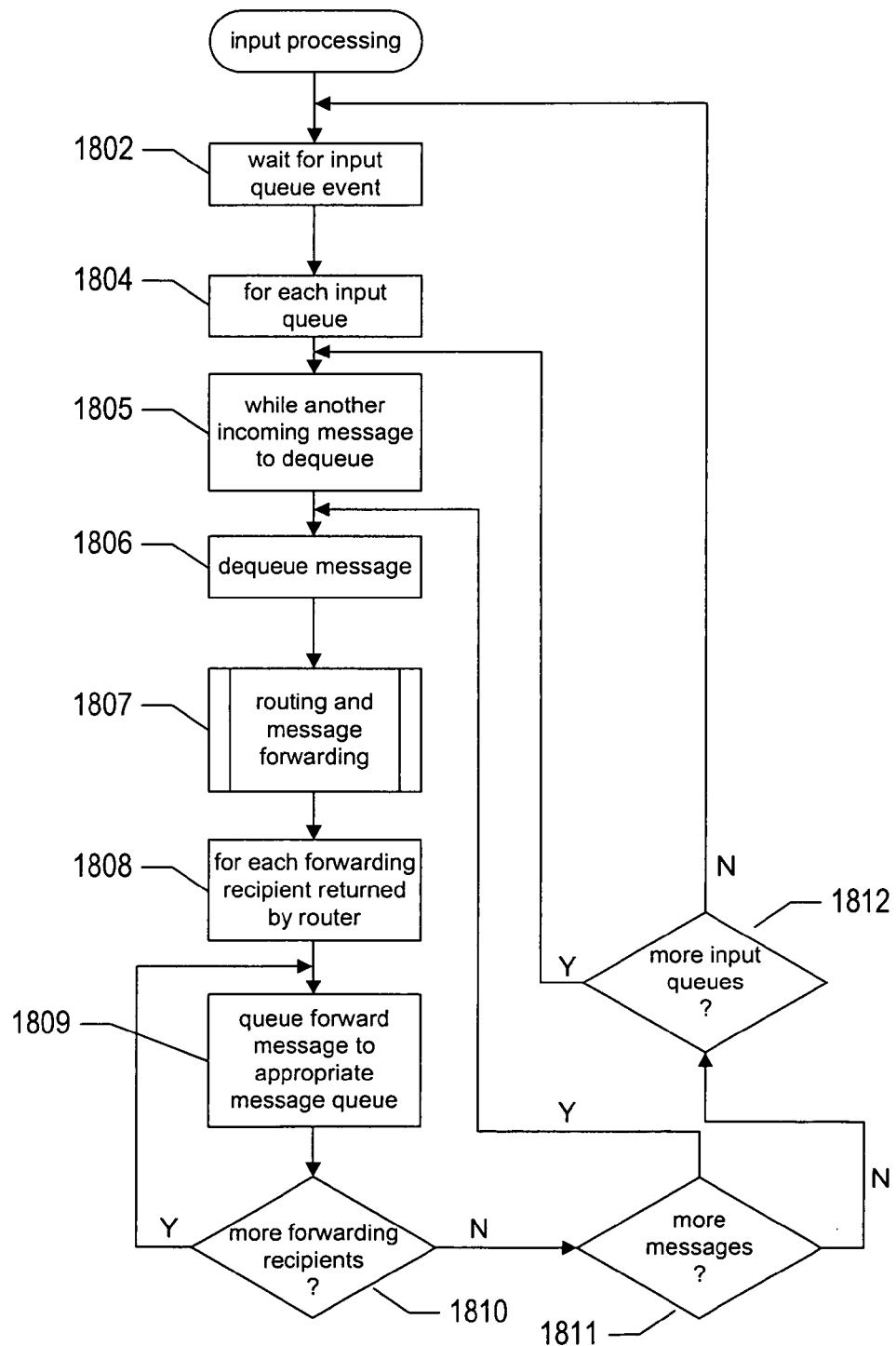
FIG. 18 provides a control-flow diagram for the input-processing subsystem of an automated communications system to which the current application is, in part, directed.

Next, control-flow diagrams are provided to illustrate the functionality embodied in each of the major subsystems of an automated communications system to which the current application is, in part, directed, shown in FIGS. 8A-B. FIG. 18 provides a control-flow diagram for the input-processing subsystem of an automated communications system to which the current application is, in part, directed. The input-processing subsystem is generally implemented as a continuous loop in which the input-processing subsystem waits, in step 1802, for a next input event. Input events include notification of reception and queuing of new messages from any of the various different communications media and associated transceivers through which the automated communications system receives information from users. When such an event occurs, the input-processing subsystem accesses each input queue in the for-loop of steps 1804-1812. For each input queue, the input-processing subsystem handles each message queued to the input queue in the inner while-loop of steps 1805-1811. For each message queued to a currently considered input queue, the input-processing subsystem dequeues the message from the queue in step 1806 and calls the routing-and-message-forwarding subsystem (830 in FIG. 8B) to process the message. The routing and message-forward subsystem responds with a list of or more reply and/or forwarding messages corresponding to the received message, which the input-processing subsystem processes in the innermost for-loop of steps 1808-1810. For each message in the list of reply and/or forwarding messages, the input-processing subsystem queues the message to an appropriate internal message queue (1812-1814 in FIG. 8A). There may be many internal message queues in an automated communications system in order to geographically distribute message-queue-based processing and/or in order to partition outgoing messages in various ways, including according to time to transmission, according to the general class of communications media to which the message are to be transmitted, and according to various other criteria. Thus, the input-processing subsystem is responsible for managing incoming messages and calling the system services subsystem to generate appropriate reply and/or forwarding messages corresponding to input messages that the input-processing subsystem then queues to the message queues for delivery to users.

Figure 19:
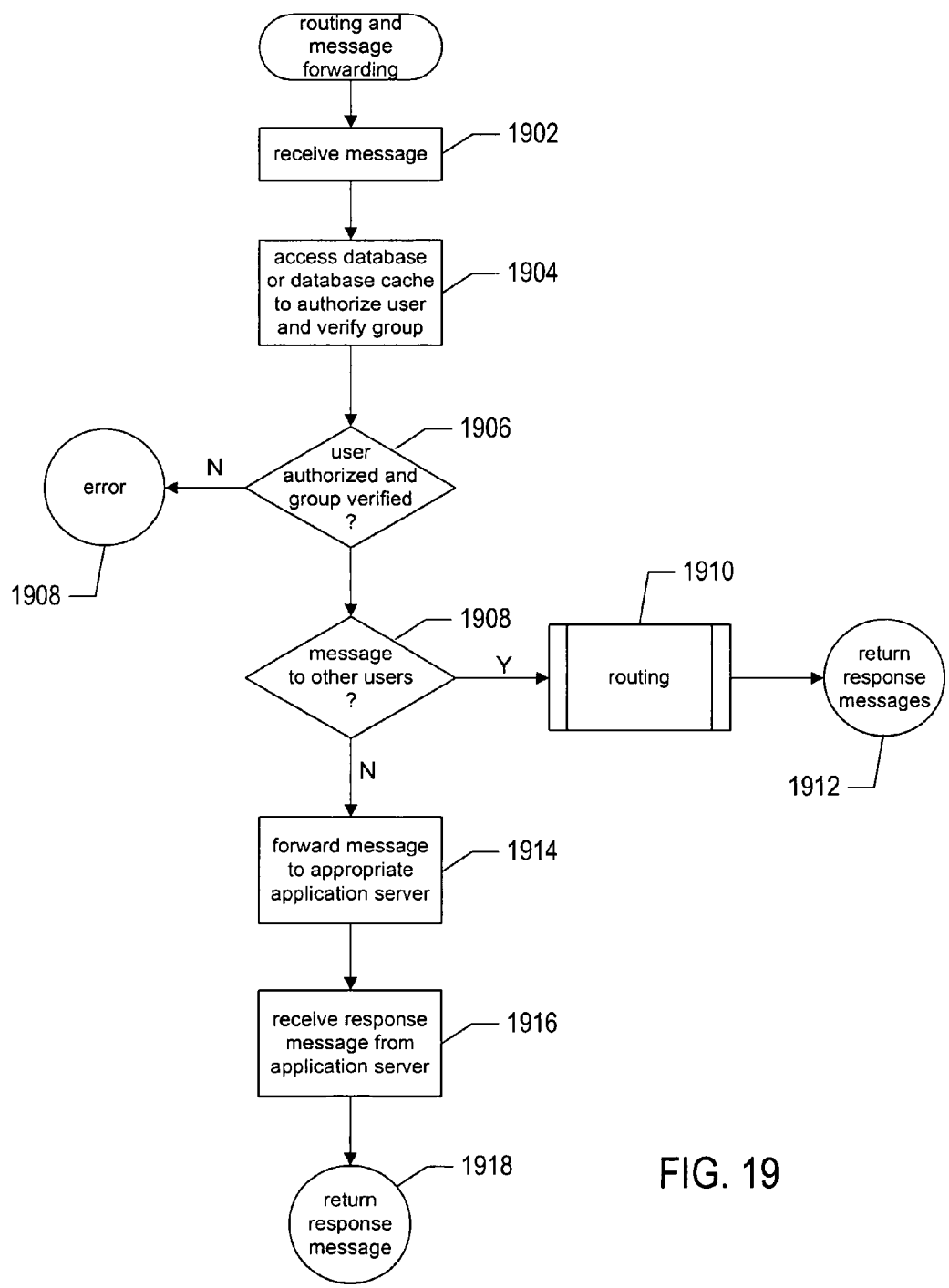
FIG. 19 provides a control-flow diagram for the routing and message-forwarding subsystem of the system services component of an automated communications system to which the current application is, in part, directed.

FIG. 19 provides a control-flow diagram for the routing-and-message-forwarding subsystem of the system services component of an automated communications system to which the current application is, in part, directed. In step 1902, the routing-and-message-forwarding subsystem receives a next message from the input-processing subsystem (808 in FIG. 8A). In step 1904, the routing-and-message-forwarding subsystem accesses the database (832 in FIG. 8B) in order to authorize the user from which the message was received and verify that the group or recipient to which the message is addressed exists, that the user is authorized to send messages to the group or recipient, and to carry out other authorization and verification tasks. When the user is not authorized to send messages within the organization, when the group or recipient cannot be verified, or when other such errors are detected, in step 1906, then the routing-and-message-forwarding subsystem invokes any of various different types of error-handling procedures 1908. These may include logging the unauthorized attempt to access the automated communications system and returning some type of error message to the sender of the message. Next, in step 1908, the routing-and-message-forwarding subsystem determines whether or not the message is intended to be forwarded to other users of the organization, in which case a routing routine 1910 is called to return a list of forwarding messages to the input-processing subsystem in step 1912, and, when the message is instead directed to an application server as part of requesting or responding to a management or configuration interface provided by the management-and-configuration service subsystem (840 in FIG. 8B), the routing-and-message-forwarding subsystem forwards the message to the appropriate application server in step 1914 (834-837 in FIG. 8B) and returns any response received from the application server, in step 1916, to the input-processing subsystem in step 1918.

Figure 20:
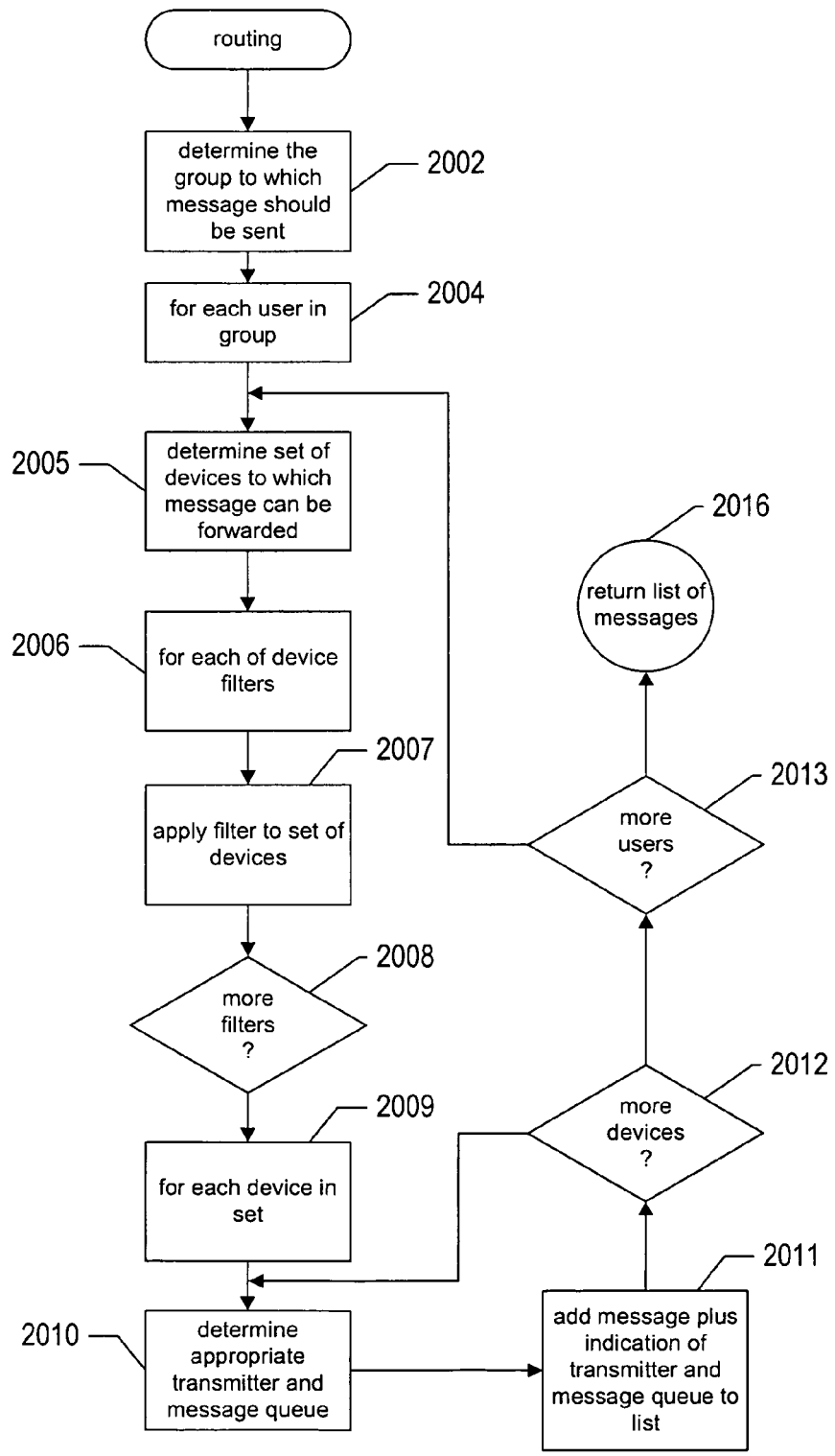
FIG. 20 is a control-flow diagram for the routing routine called in step 1910 of FIG. 19.

FIG. 20 is a control-flow diagram for the routing routine called in step 1910 of FIG. 19 according to the current application. The routing routine first determines the group to which the message is to be sent, in step 2002. Then, in the for-loop of steps 2004-2013, the routing routine prepares a message for forwarding to each user in the group to which the sender of the message intends the message to be forwarded. In step 2005, the routing routine determines the set of devices to which the message can be forwarded for the currently considered user or member. This set of devices may be, for example, all devices owned by the member, as determined from a member data structure accessed from the database, which are compatible with the device and/or communications medium from which the initial message was received by the automated communications system. Then, in an inner for-loop of steps 2006-2008, the routing routine applies one or more filters to the initial set of devices in order to select one or a few devices for the recipient user to which the message can be forwarded. These filters correspond to the many different types of considerations discussed above with reference to FIGS. 5 and 6. For example, one filter may incorporate the time-of-day information for the user and the user's devices, as illustrated in FIG. 5. Other filters may incorporate many other considerations, such as the type of information that is being sent, the location of the recipient, date, and many other such considerations. The filters may be implemented as a set of logic propositions, complex decision trees, or in many other ways. Once the initial list of devices has been filtered to produce a final list of devices for the user, then, in the for-loop of steps 2009-2012, the routing routine prepares a message for each device of the recipient, including indications of the appropriate transmitter and message queue for queuing the message and adds the message to a list of messages. When messages have been prepared for all devices of all users, then the entire list of messages is returned to the routing-and-message-forwarding subsystem in step 2016.

Figure 21:
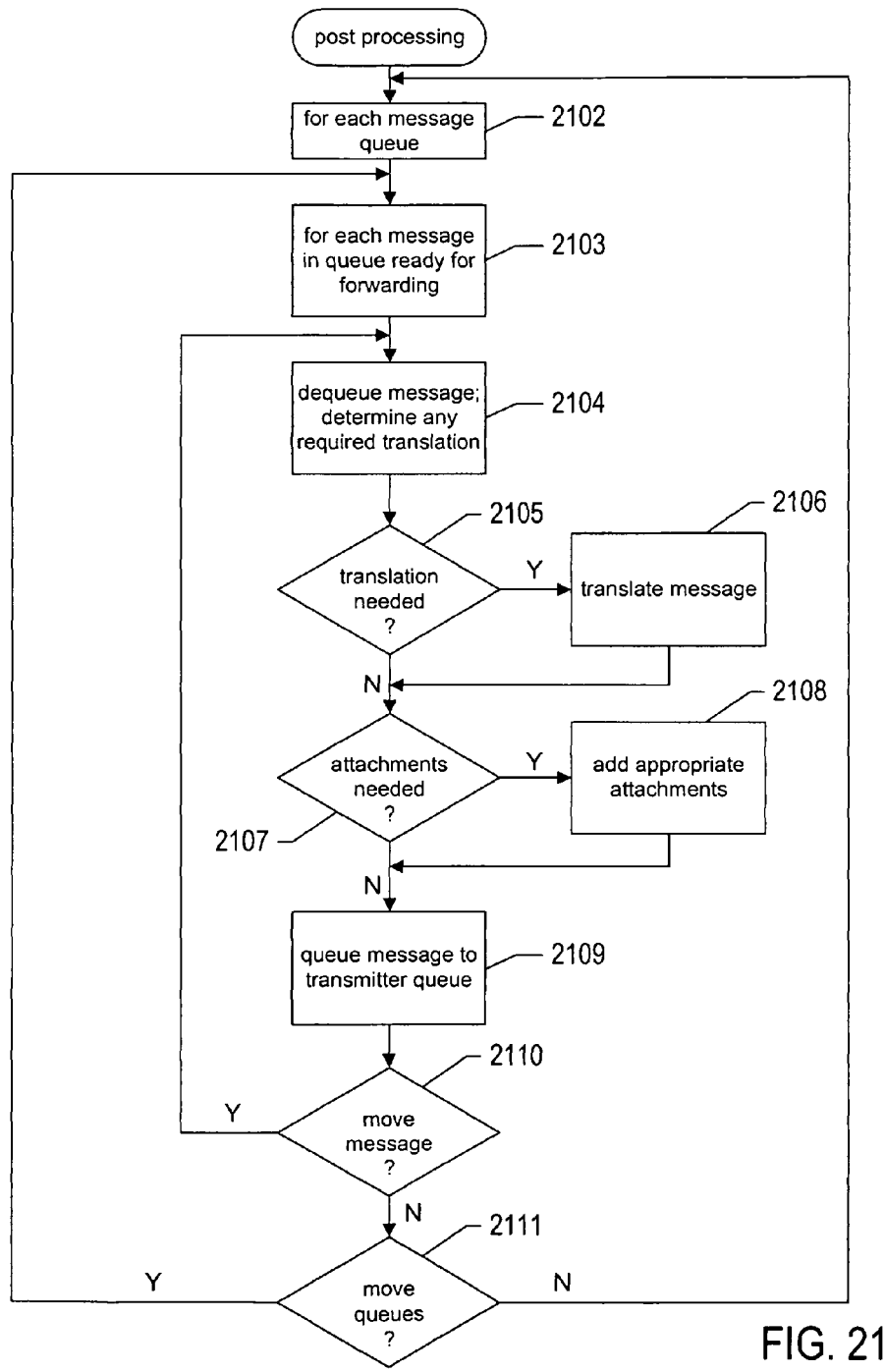
FIG. 21 provides a control-diagram for the post-processing subsystem of an automated communications system to which the current application is, in part, directed.

FIG. 21 provides a control-diagram for the post-processing subsystem of an automated communications system to which the current application is, in part, directed. The post-processing subsystem, 816 in FIG. 8A, dequeues messages from the message queues for queuing to individual transmitter queues associated with transmitters or transceivers. In the outer for-loop of steps 2102-2111, the post-processing subsystem continuously examines each of the internal message queues. In the inner for-loop of steps 2103-2110, the post-processing subsystem dequeues all messages ready for forwarding or transmission from the currently considered message queue. In step 2104, the post-processing subsystem dequeues the next message from the currently considered message queue and determines whether or not any translation is required for the message. If translation is needed, as determined in step 2105, the message is translated in step 2106 in a way appropriate for the type of device, communications medium, group, and recipient to which the message is to be transmitted. In step 2107, the post-processing subsystem determines whether any attachments need to be attached or appended to the message and, if so, adds or appends the appropriate attachments in step 2108. In step 2109, the post-processing subsystem queues the final, translated and completely post-processed message to the appropriate transmitter queue.

Automated communications systems to which the current application is, in part, directed provide a wealth of different types of features, functionalities, and services to the members of an organization. As one example, information sent by a user to a group of users can be translated and processed, according to various criteria and considerations, prior to being forwarded to the users of the group. For example, text messages contained in email sent by one user to the members of a group can be reformatted, abbreviated, or otherwise processed to allow the message to be sent to communications devices, such as to mobile phones, with limited text-display capabilities or even via instant messaging services. This type of processing may also involve translating a message from one language to another, selecting only portions of the message suitable for each recipient, and many other types of translation and processing tasks. The automated communications system may carry out a complex set of operations and considerations to optimize information transmission. For example, when the urgency for message delivery to members of the group is relatively low, the automated communications system may delay message transmission to certain recipients in order to take advantage of favorable communications rates or device availabilities with respect to particular recipients. The automated communications system to which the current application is, in part, directed may similarly optimize message forwarding with respect to many different considerations, including selecting the most effective device or devices to reach a particular user on a particular date, at a particular time of day, or with regard to many other constraints and considerations. Incorporation of multiple application servers within the system-services subcomponent of the automated communications systems allows for feature-rich, flexible management-and-configuration interfaces to be displayed to users on each of the various different types of communications devices to which the user selects to access the management and configuration services.

As discussed above, the automated communications system may use file-pathname-like addresses in order to direct messages received by the automated communications system to particular users within particular subgroups and groups. One example addressing convention is discussed above with reference to FIG. 14. This type of addressing, as well as the authorization carried out in step 1904 of the routing-and-message-forwarding subsystem illustrated in FIG. 19 and the message-translation step 2104 of the post-processing subsystem shown in FIG. 21, provides for relatively fine-granularity control over message delivery, access to users by parties external to the automated communications system as well as by other users of the automated communications system, and output of information from the automated communications system that facilitates identification and access of users of the automated communications system. As also mentioned above, the automated communications system receives messages both from external parties as well as from users of the automated communications system and transmits messages both to external parties as well as to users of the automated communications system. As one example, an external party may send a message to a user of the automated communications system who may reply to the received message, thus generating a new message that is received by the automated communications system and transmitted to the external entity.

FIGS. 22A-J illustrate applications of authorization, message translation, and navigational naming conventions, and features provided by these aspects of the automated communications system, that constitute useful characteristics of automated communications systems to which the current application is, in part, directed. All of FIGS. 22A-J use similar illustration conventions, next described with respect to FIG. 22A. The figures are each divided by a vertical dashed line 2202, which represents the interface between senders of messages to users of the automated communications system and the automated communications system. A single user group with hierarchically organized subgroups is shown, in tree-like fashion, within a rectangular dashed box 2204 on the automated-communications-system side of each figure. Small rectangles, such as rectangle 2206, represent users of the automated communications service, and are labeled with user names "u1," "u2," . . . , "u11." The group 2208 is represented by a large rectangle and is named "group." A first hierarchical layer of subgroups includes a first subgroup named "subgroup 1" 2210 and a second subgroup named "subgroup 2" 2212. A second hierarchical level of subgroups derived from subgroup 1 include "subgroup A" 2214 and "subgroup B" 2216. The users associated directly with each subgroup are shown connected to the subgroup with lines, such as line 2209. To the left of the vertical dashed line 2202, a message 2218 is shown being input to the automated communications system. The message includes a TO address 2220 and a FROM address 2222. In certain subsequent figures, a second, output message is shown being returned from the automated communications system in response to the input message.

Figure 22A:
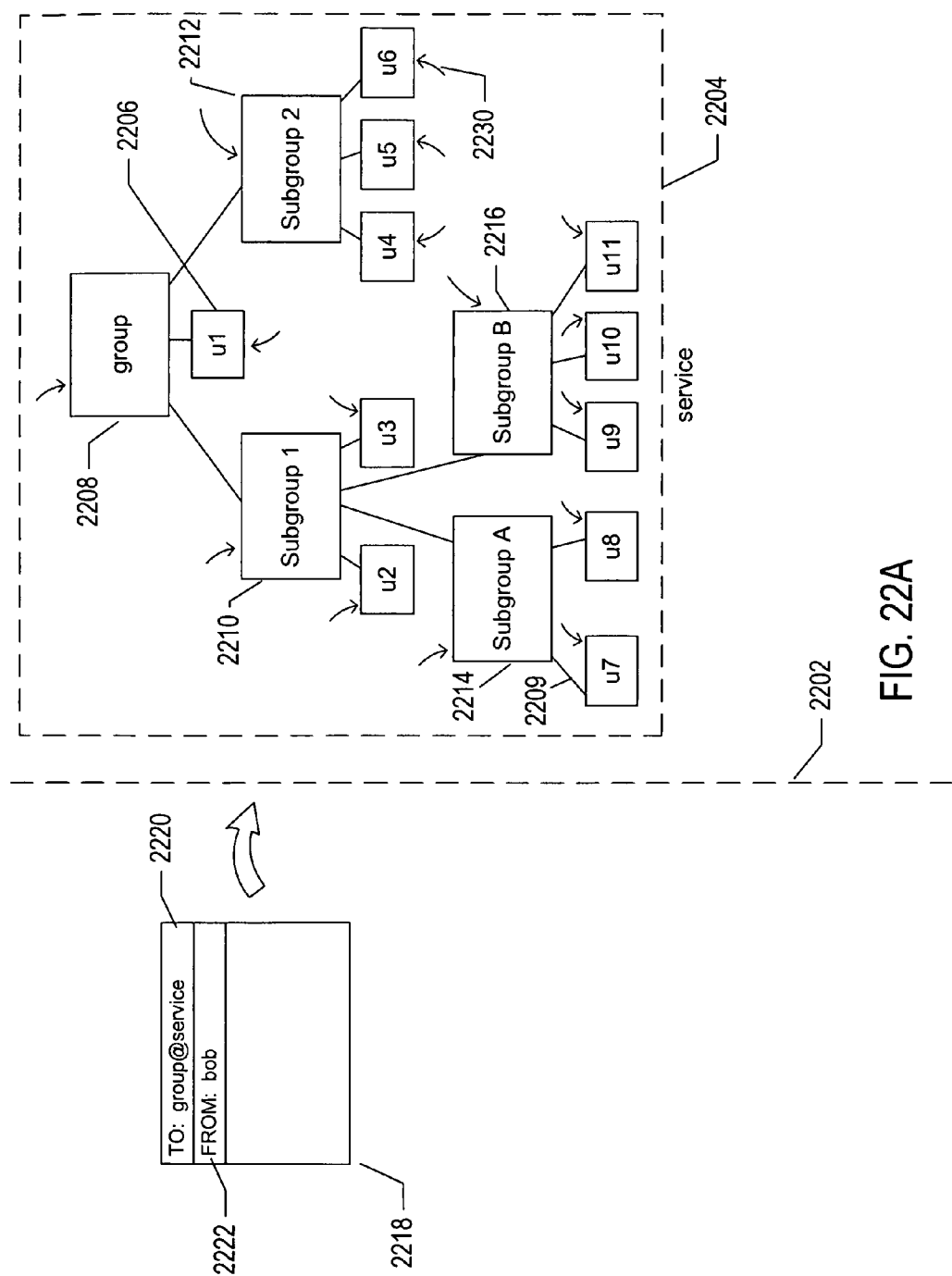
FIGS. 22A-J illustrate applications of authorization, message translation, and navigational naming conventions, and features provided by these aspects of the automated communications system, that constitute useful characteristics of automated communications systems to which the current application is, in part, directed.

In FIG. 22A, the input message 2218 is directed to the group shown on the right-hand side of FIG. 22A, represented by node 2208, using the TO address "group@service" 2220. The message is received from an entity having the address "bob," shown in the FROM address 2222 of the input message. In this and subsequent examples, the character strings employed within addresses are used for illustration purposes. Actual messages would include names complying with particular naming conventions and formats used for a particular type of communications media.

Figure 22B:
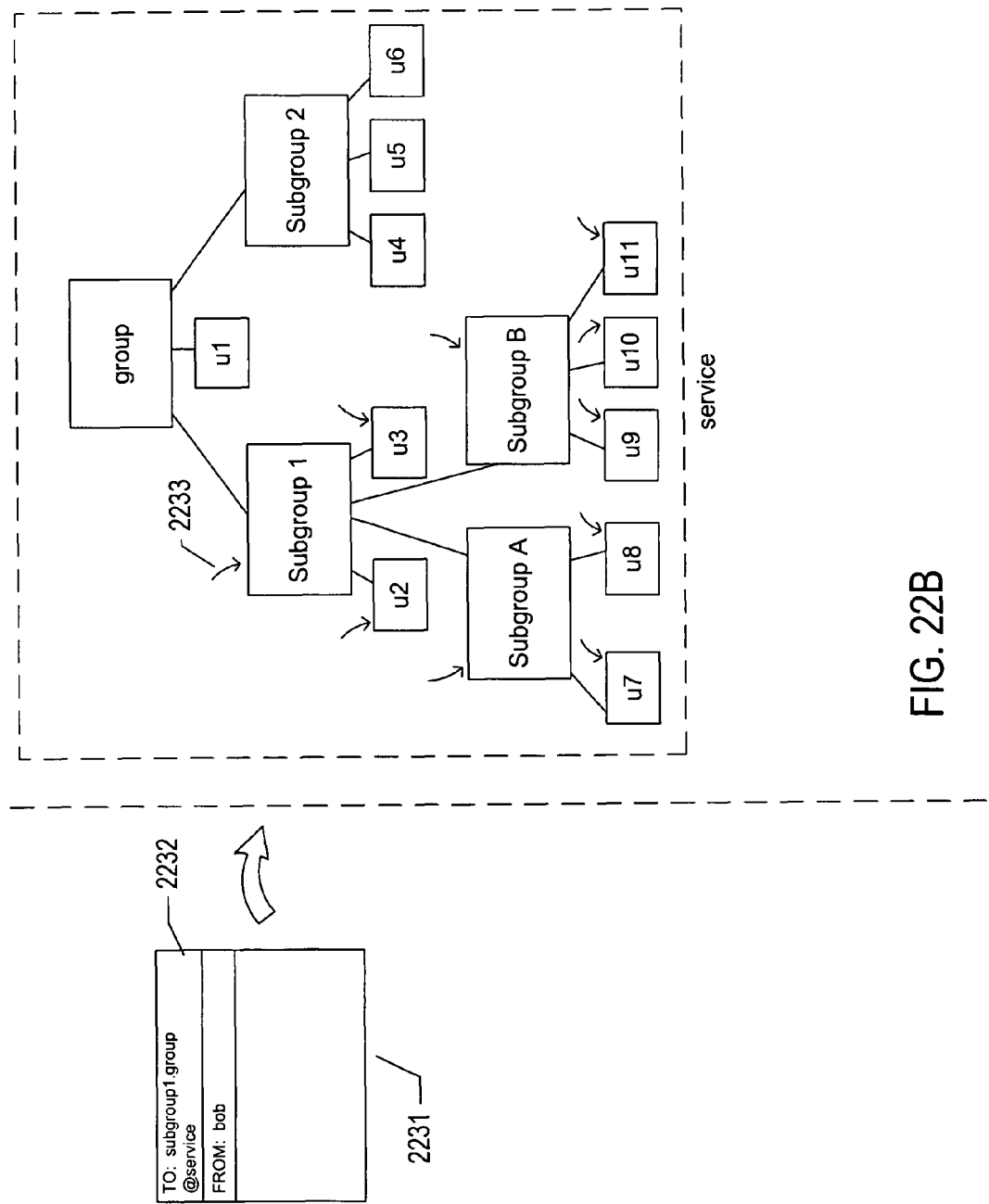
Figure 22C:
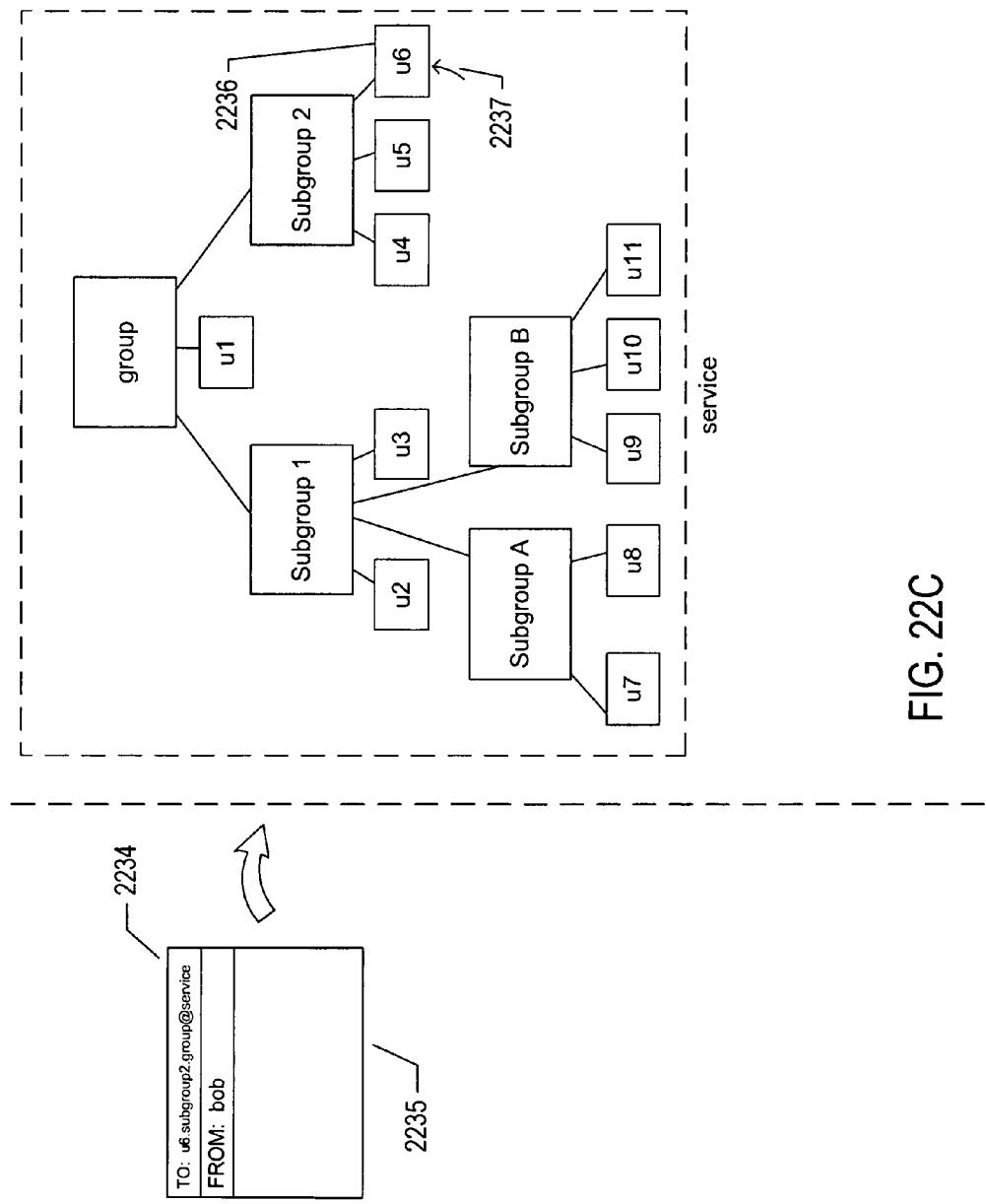

As shown in FIG. 22A, when the input message 2218 is addressed to the group, "group@service," the message ends up being routed, as indicated by arrows, such as arrow 2230, to every user associated with every node within the hierarchical organization of group nodes and subgroups nodes, in accordance with one possible group-name-to-user routing methods. By contrast, as shown in FIG. 22B, when an input message 2231 is addressed to a particular subgroup within the group 2232, "subgroup1.group@service," then, as indicated by arrows, such as arrow 2233, the message is routed to users within subgroups including the subgroup to which the message is addressed and all lower-level ancestor subgroups of the subgroup. As shown in FIG. 22C, when the TO address 2234 of an input message 2235 includes sufficient specificity to identify a particular user within a group, the input message is routed to that particular user 2236, as indicated by arrow 2237 in FIG. 22C.

Figure 22D:
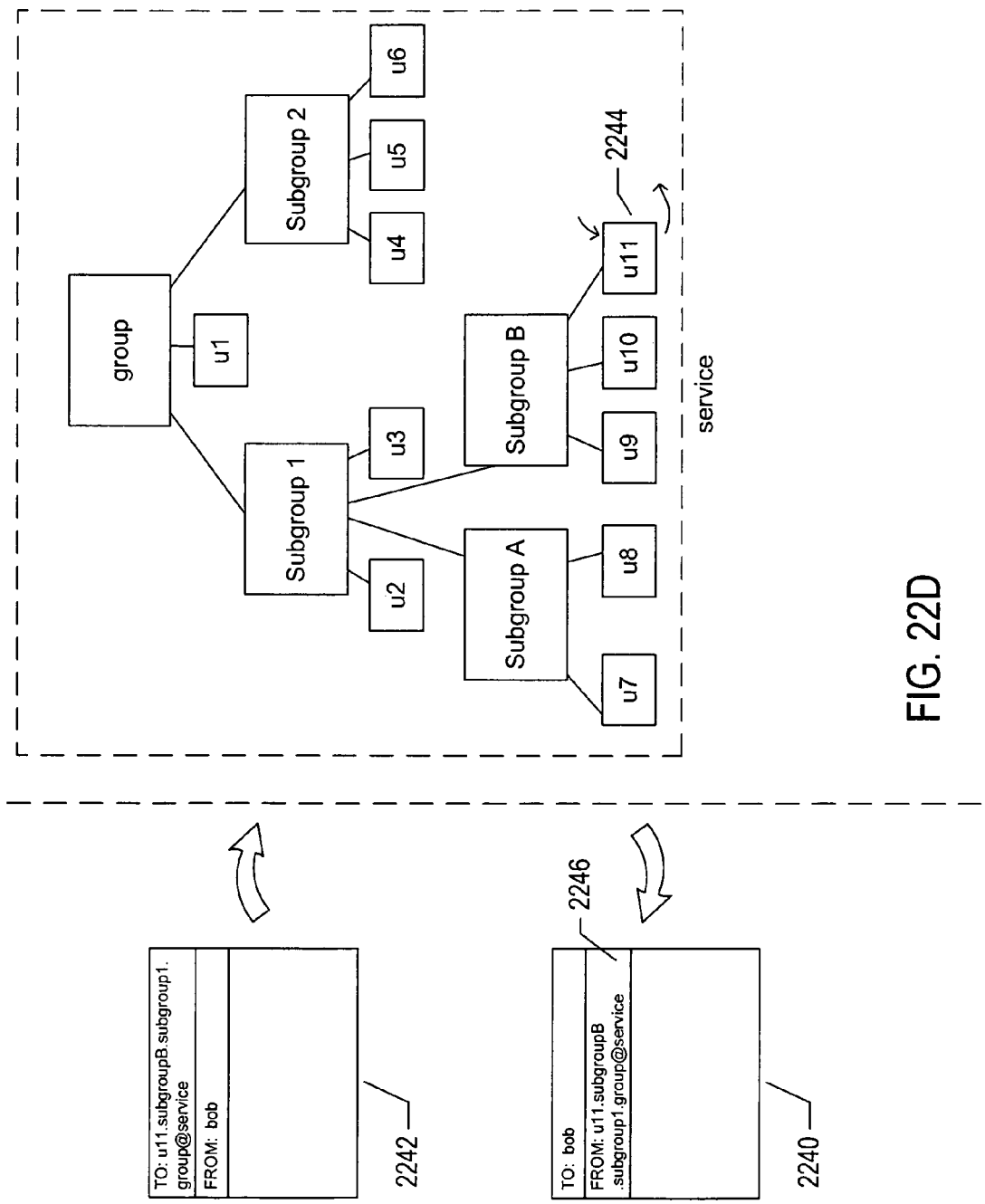
Figure 22E:
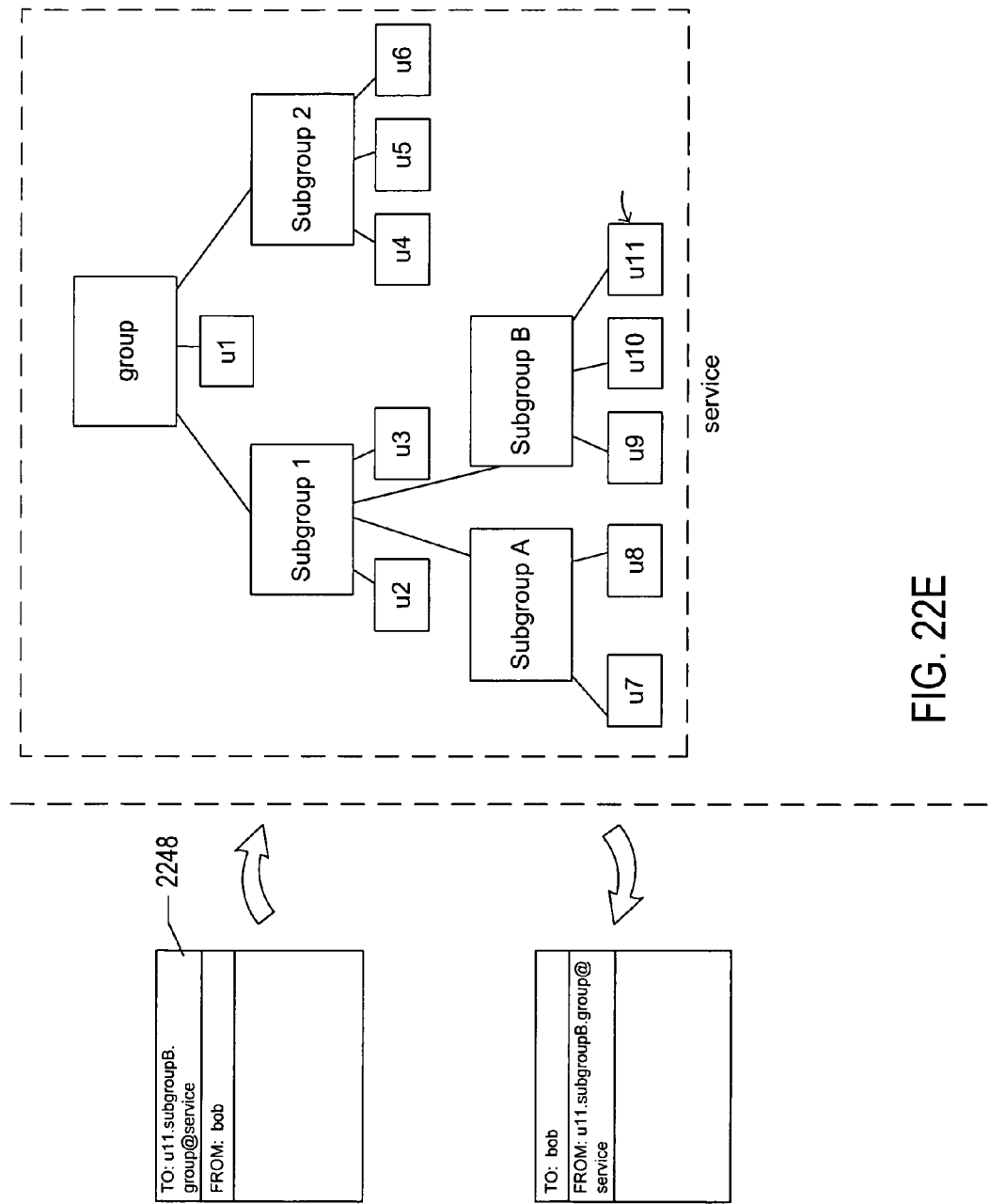
Figure 22F:
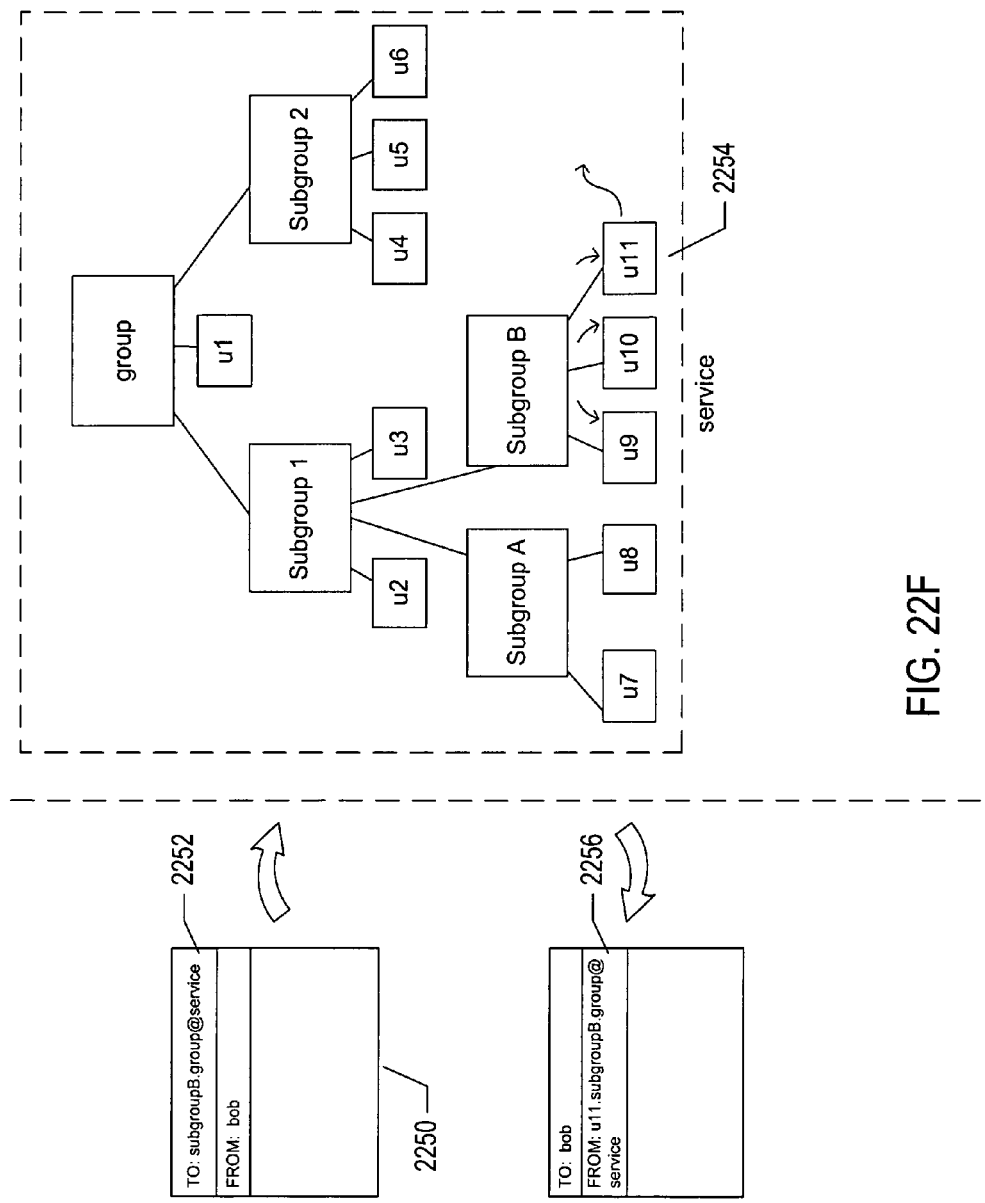
Figure 22G:
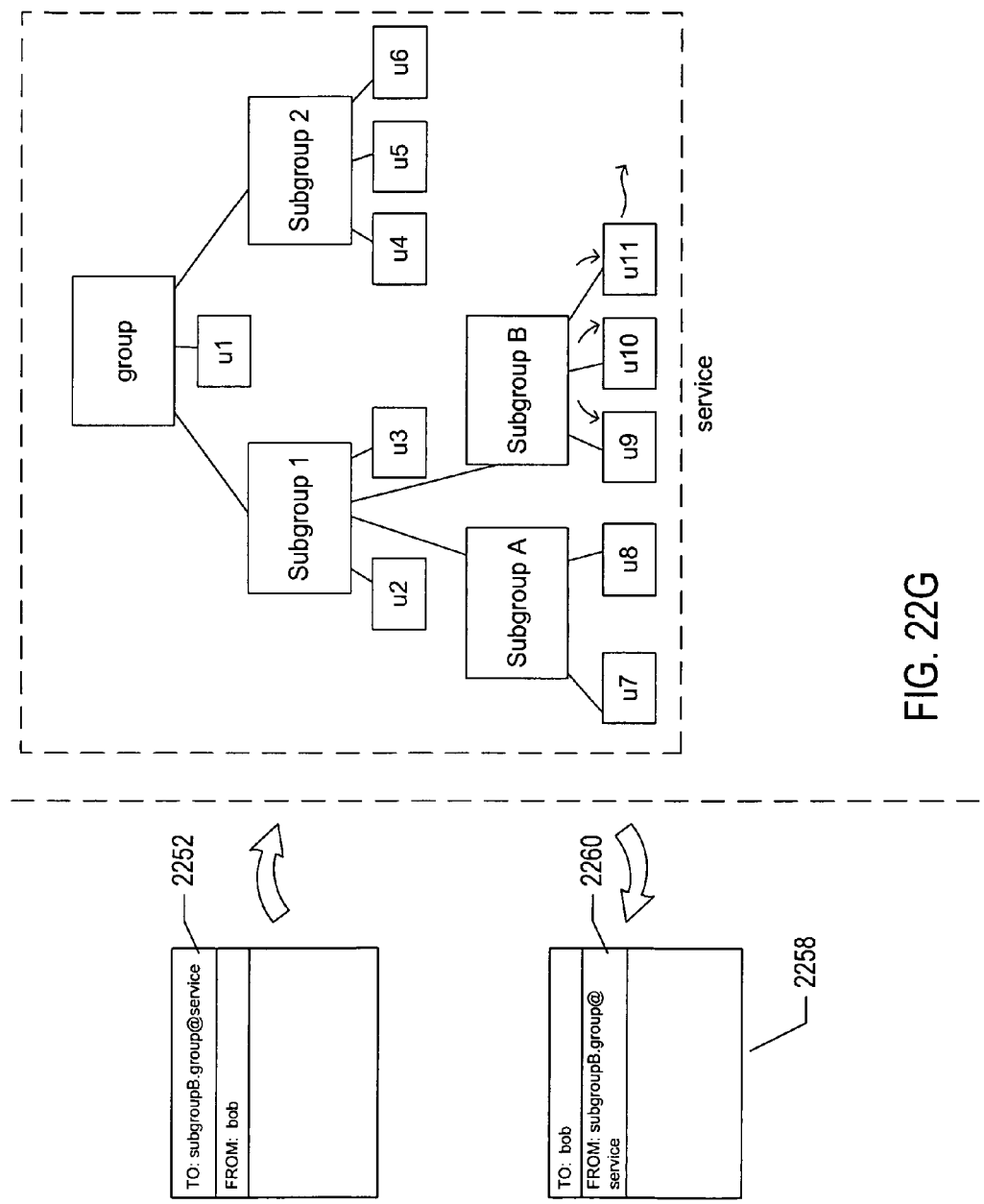
Figure 22H:
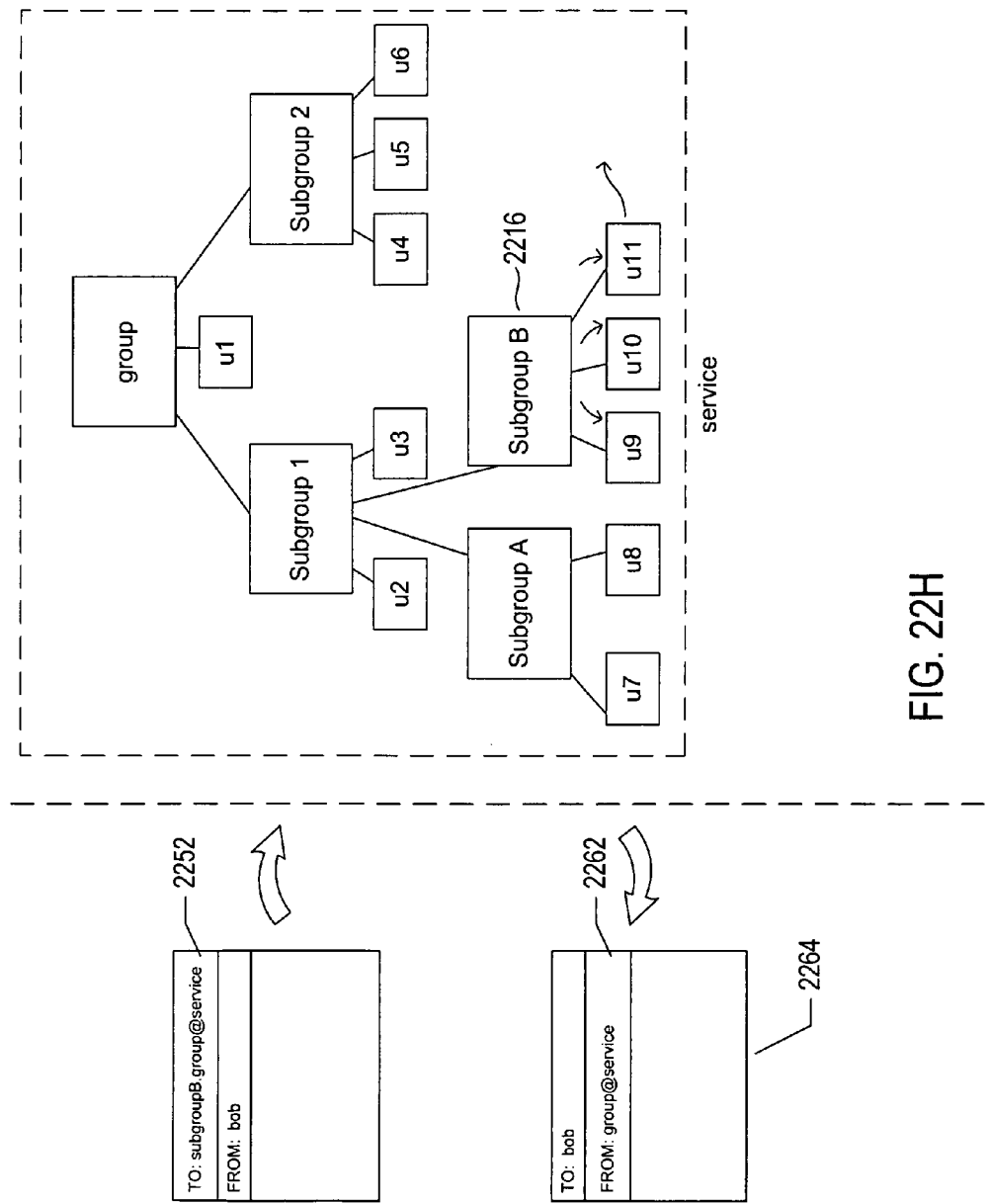

As shown in FIG. 22D, a message output by the automated communications service 2240 in response to an input message 2242 directed to a particular user 2244 may include, as a FROM address 2246, the full address specified in the TO address of the input message 2242. As shown in FIG. 22E, in the case that subgroup identifiers within a group have unique names within the group, the TO address 2248 may omit intermediate subgroup names provided that a unique destination subgroup or user can be determined from the abbreviated address by the automated communications system. As shown in FIG. 22F, an input message 2250 addressed to a particular subgroup 2252 may be received by a particular user 2254 who then responds to the message. The FROM address of the response message 2256 may contain a more particular identifier of this user than the TO address 2252 in the input message that was routed to the user. Alternatively, as shown in FIG. 22G, the output message 2258 may include, as a FROM address 2260, the same address used as the TO address of the input message 2252. As shown in FIG. 22H, the FROM address 2262 of an output message 2264 may contain a FROM address which is less specific than the TO address 2252 of the input message with respect to which the output message 2264 is transmitted as a response. Similarly, it is conceivable that the FROM address of the response message may be directed to a user, subgroup, or group entirely unrelated to the user, subgroup, or group to which the corresponding input message was directed.

The modifications of FROM addresses may be specified by policies stored within the automated communications system. For example, there may be a policy associated with subgroup 2216 that individual user names should not be included in FROM addresses of messages transmitted in response to messages directed to the subgroup. Alternatively, a different policy may direct all subsequent correspondence to an entirely different group or subgroup.

Figure 22I:
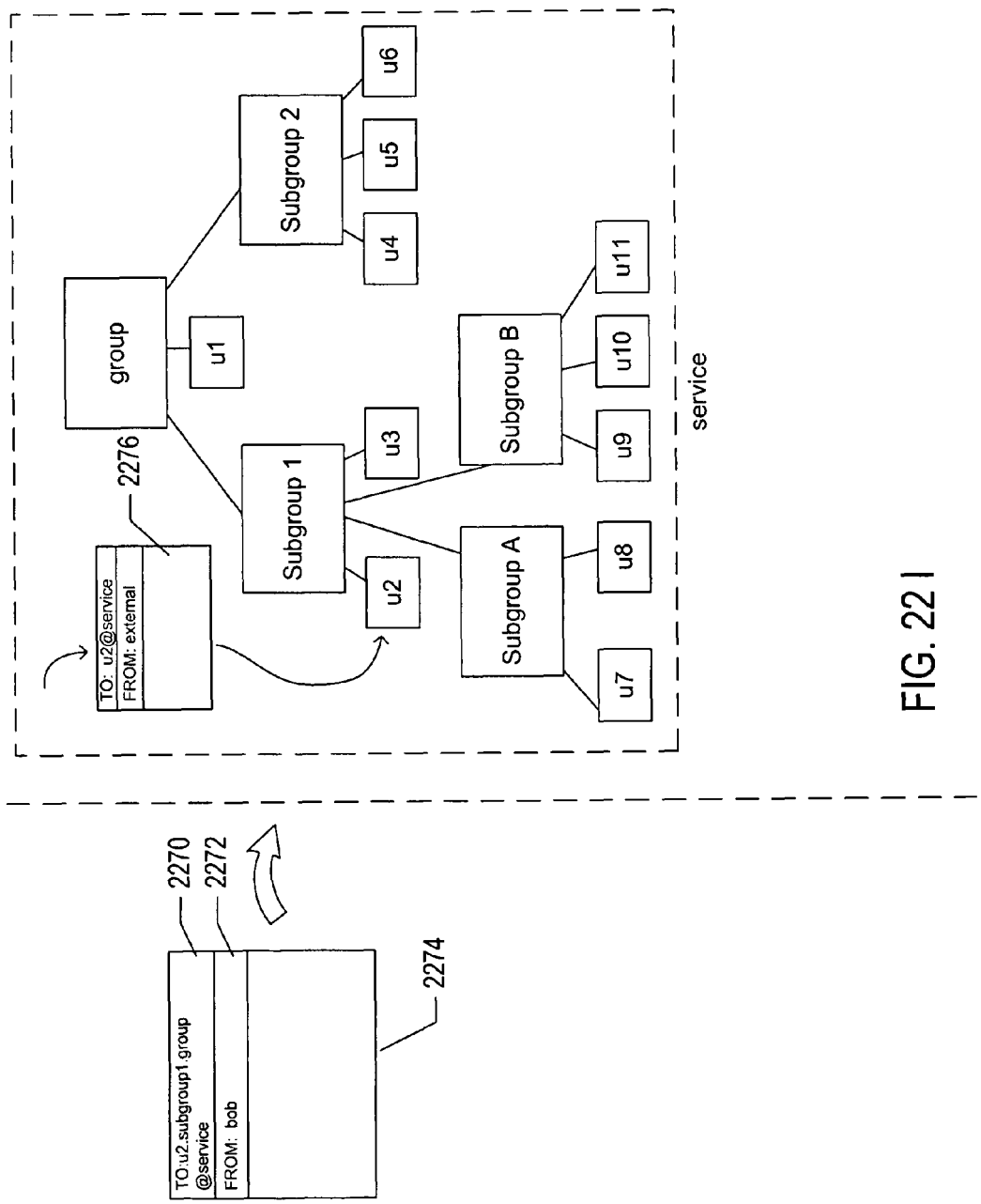

As shown in FIG. 22I, the TO address 2270 and/or FROM address 2272 of an input message 2274 may be changed, or translated, following input to the automated communications system produce a modified internal message 2276 that is actually transmitted to one or more users. Thus, not only may the TO and FROM addresses be altered in messages transmitted from the automated communications system in response to input messages, but may also be altered with respect to input messages prior to internal routing within the automated communications system to message recipients.

Figure 22J:
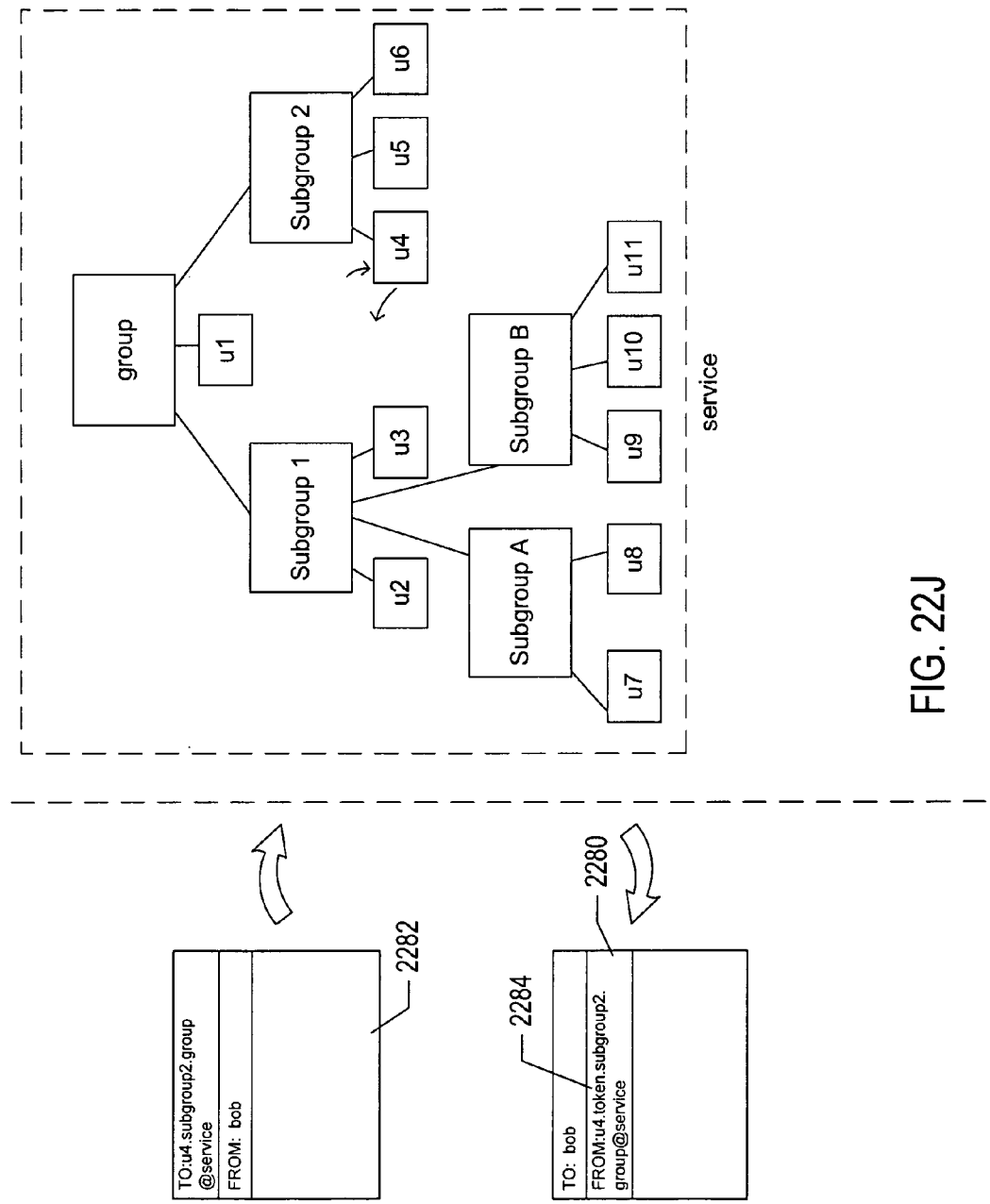

As shown in FIG. 22J, the FROM address 2280 of an output message sent in response to an input message 2282 may include additional information, such as tokens 2284 associated with one or more node names within the address. These tokens may have short validity periods and may be required for subsequent addressing of input messages to particular users, subgroups, or groups within the automated communications system. Tokens may be pseudo-randomly generated, generated from, or include, cryptographic hashes or encryption keys, that employ other techniques to prevent token generation from producing recognizable patterns of tokens and to prevent tokens associated with subsequent validity periods from being easily guessed or derived from tokens of preceding validity periods by malicious message senders.

Figure 23:
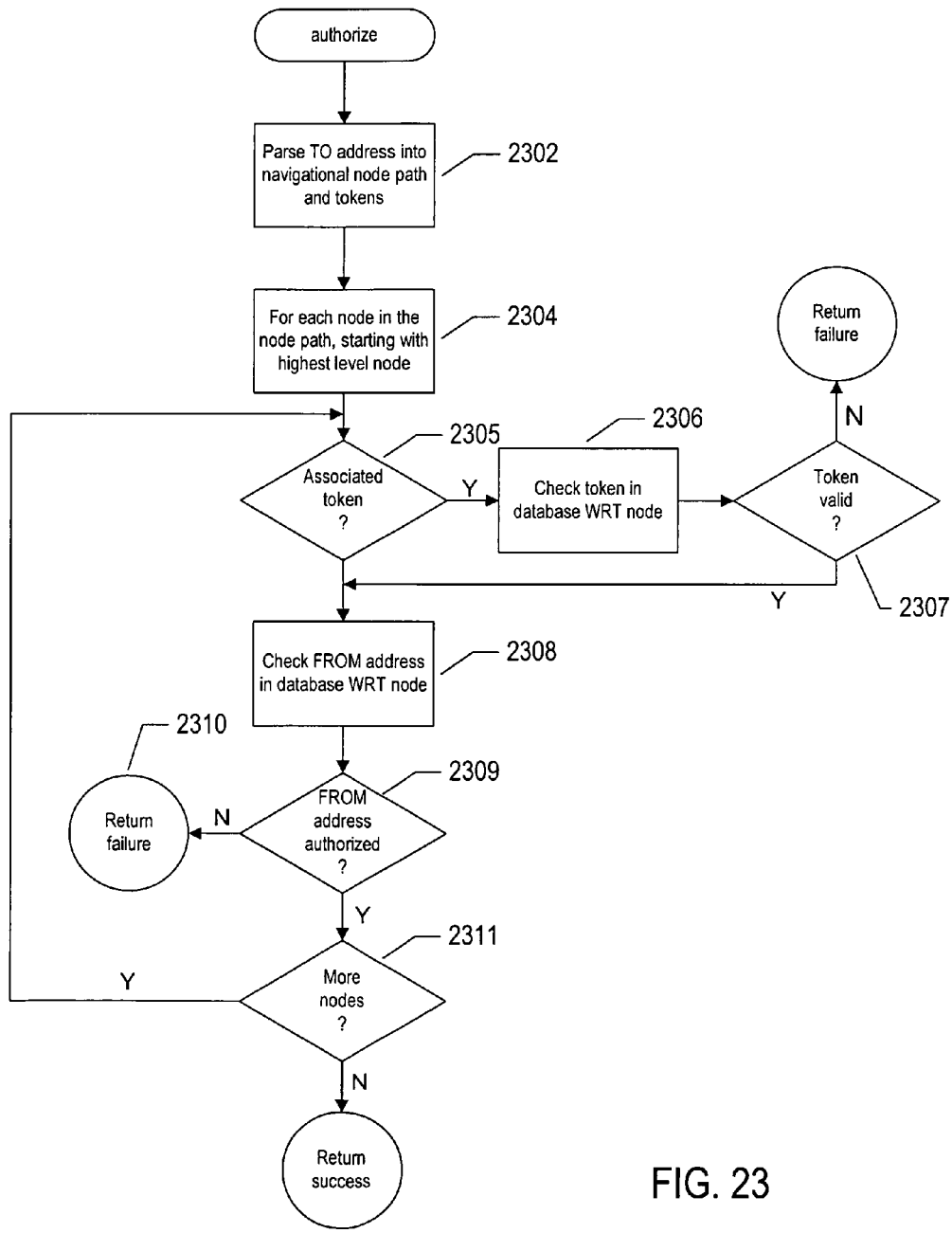
FIG. 23 provides a control-flow diagram that illustrates details of the authorization step 1904 of FIG. 19 to which the current application is, in part, directed.

FIG. 23 provides a control-flow diagram that illustrates details of the authorization step 1904 of FIG. 19 to which the current application is, in part, directed. In particular, FIG. 23 shows how the automated communications system controls access to users of the automated communications system by other users of the automated communications system as well as by external parties who send messages to the automated communications system. In step 2302, the authorization method parses the TO address of an incoming message into an ordered set of nodes and associated tokens. For example, the TO address "u4.token1.subgroup2.token2.group@ service" is parsed into the ordered set of nodes and associated tokens: "group," "subgroup2/token2," and "u4/token1." As another example, the TO address "u4.token1.subgroup2.group@ service" is parsed into the ordered set of nodes and associated tokens: "group," "subgroup2," and "u4/token1." Next, in the for-loop of steps 2304-2311, the authorization routine considers each node or node/token pair of the ordered set of nodes and associated tokens in highest-level-to-lowest-level sequential order. If there is a token associated with the currently considered node, as determined in step 2305, then the automated communications system checks one or more entries in the database with respect to the currently considered node in order to determine whether the token associated with the node is valid for the current time period. If a token is not valid, as determined in step 2307, a failure indication is returned. Otherwise, the FROM address of the message is checked with respect to entries in the database for the currently considered node in step 2308. If the FROM address is not authorized to access the node, as determined in step 2309, then a failure indication is returned in step 2310. The for-loop continues to process the nodes within the pathname-like address until all nodes have been considered, as determined in step 2311. Determination of whether the FROM address is authorized to access the node may involve finding a database or cache entry that positively authorizes the FROM address, failing to find a database or cache entry that blocks the FROM address from accessing the node, or by applying one or more stored rules to the FROM address and node to determine whether or not the FROM address is authorized to access the node.

By using the authorization method discussed above with reference to FIG. 23, the automated communications system can control, at very fine granularity, who may send messages to particular users, subgroups of users, and groups of users of the automated communications system. The authorization method may vary in alternative implementations, traversing pathname-like addresses in different orders, applying various different types of rules, stored within the automated communications system, concerning who may send messages to automated-communications-system users and the automated-communications-system users who may receive messages from other users and entities external to the automated communications system.

Figure 24:
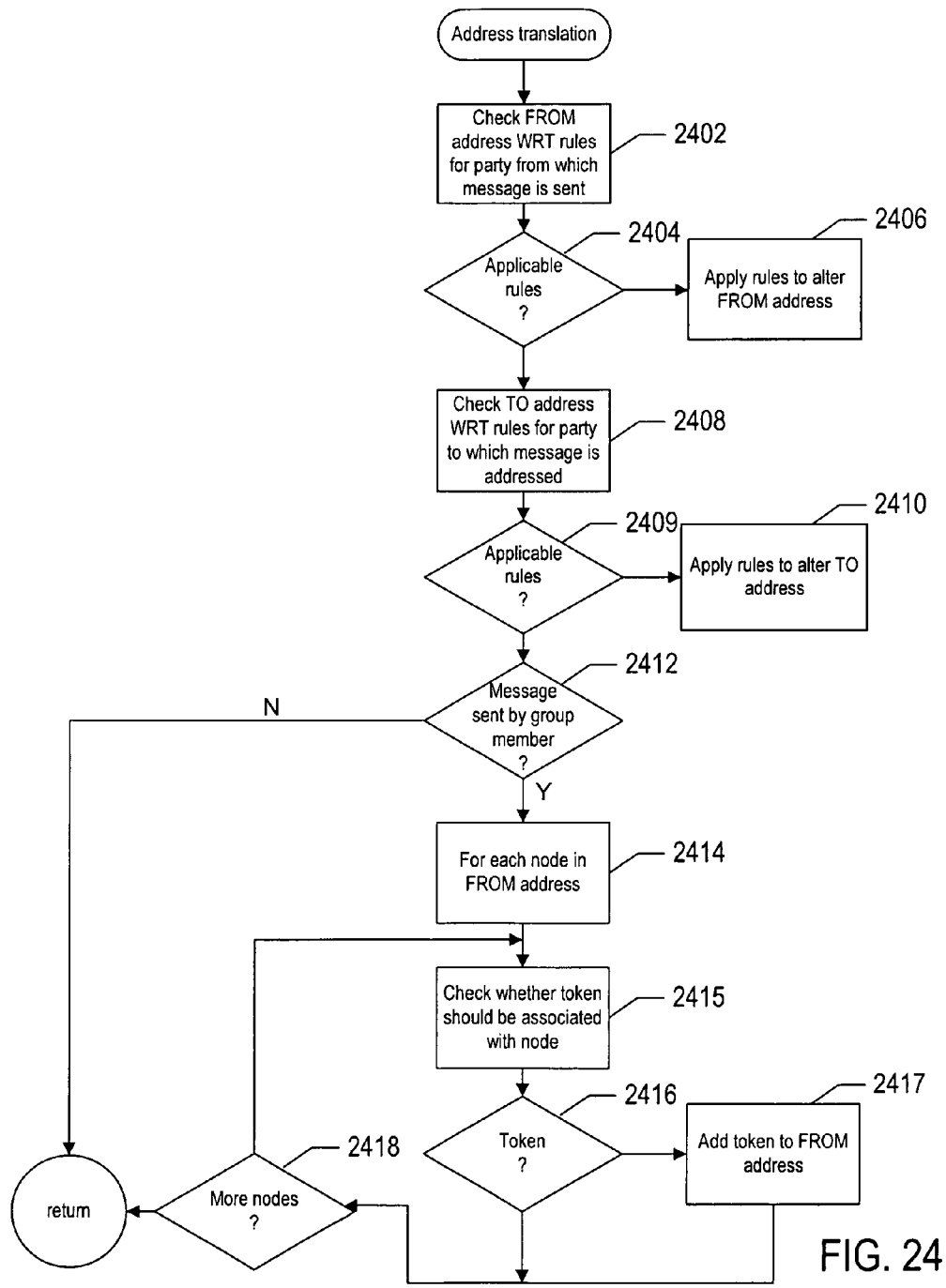
FIG. 24 provides a control-flow diagram for an address-translation portion of the message-translation step 2104 of FIG. 21 to which the current application is, in part, directed.

FIG. 24 provides a control-flow diagram for an address-translation portion of the message-translation step 2104 of FIG. 21 to which the current application is, in part, directed. Address translation allows a TO and/or FROM address associated with a message to be altered according to various rules stored within the automated communications system. In step 2402, the address-translation routine checks the FROM address of a message with respect to rules for the party from which the message is being sent. If there are any applicable rules for the party, including rules associated with any groups or subgroups in the address, as determined in step 2404, then the rules are applied to alter the FROM address within the message in step 2406. Similarly, in step 2408-2410, the TO address of the message may be altered by applying any rules applicable to the TO address for the message. Thus, address-translation may be used to alter the FROM address and the TO address of a message according to stored rules or other stored information. These address translations may have the effect of routing replies to the message to one or more destinations in addition to, or instead of, the sender's address and may have the effect or routing the message to one or more destinations in addition to, or instead of, the recipient specified by the sender. The automated communications system can similarly reroute messages in step 2002 of the routing subsystem shown in FIG. 20. When the message is being sent by a group member or other user of the automated communications system, as determined in step 2412, then in the for-loop of steps 2414-2418, any nodes in the FROM address with which tokens need to be associated are associated with the current valid token for the node, obtained from a database within the automated communications system or a token cache, or generated programmatically by the post-processing subsystem.

Translating TO and FROM addresses of messages, both incoming messages to users of the automated communications system and outgoing messages sent by users of the automated communications system, the automated communications system can carefully control information that identifies both external entities to users of the automated communications system and that identifies users of the automated communications system to external entities. Using these methods, an automated communications system can ensure that individual users, for example, cannot be identified by certain external users addressing messages to groups or subgroups at levels above individual users. Similarly, policies created and managed by the automated communications system may ensure that particular members of particular groups and subgroups who receive messages from external entities cannot identify those external entities and reply to them. By automatically inserting tokens within FROM addresses into messages output from the automated communications system, the automated communications system can ensure that these addresses cannot be indefinitely used by spammers or other malicious communicators who obtain automated-communications-system addresses. Thus, the TO and FROM addresses within messages received by and transmitted by the automated communications system can be modified according to rules and logic for a variety of reasons, including for security and for efficiency in directing messages to designated receivers. In addition, address translation can be employed to redirect a message or send additional copies of a message to users or entities other than the specified recipient and to redirect replies to a message or send additional copies of replies to a message to users or entities other than the sender of the message.

Multi-Channel Announcement System

The above-discussed automated communications systems provides a technological platform for implementation of a variety of higher-level communications features and communications subsystems. The present application is directed to a particular communications feature by which organizations can provide alerts, announcements, warnings, and bulletins to members of the organizations, customers or clients of the organization, and others to which the organization desires the announcements, bulletins, warnings, and notices to be forwarded.

Figure 25:
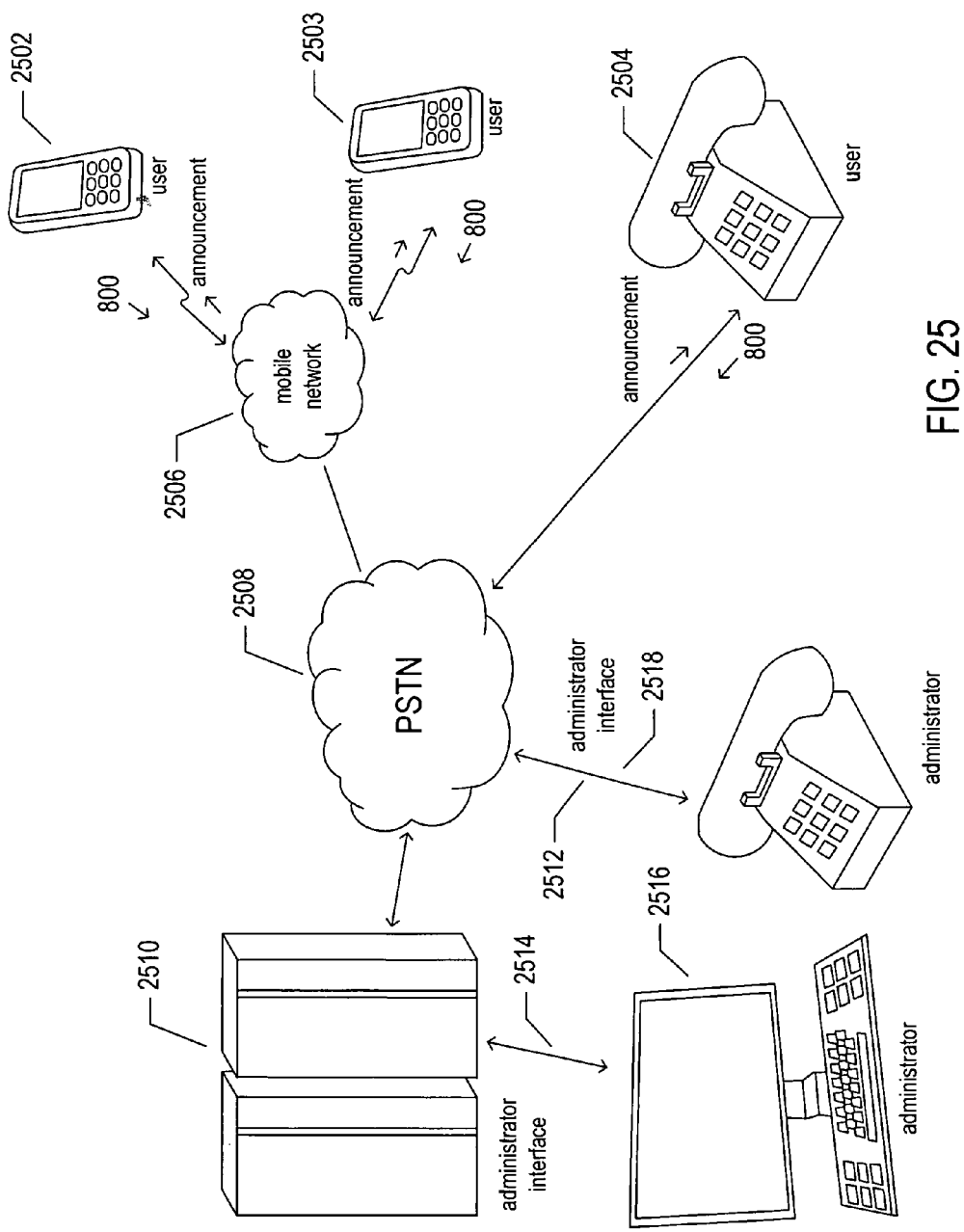
FIG. 25 shows an 800-toll-free number approach to providing announcements and bulletins.

Currently, organizations employ 800 toll-free numbers and/or websites to provide timely announcements, bulletins, warnings, and notices, both to members of the organization as well as to the public. FIG. 25 shows an 800-toll-free number approach to providing announcements and bulletins. In this system, users, which are generally employees, customers, clients, or others associated with an organization, call an 800 toll-free number via a cell phone 2502-2503 or land-line phone 2504. The call is routed through one or both of the mobile network 2506 and public switch telephone network 2508 to an automated message service generally provided in a computational system 2510. The automated message service may be implemented computer systems within telephone-service providers, by third-party automated-message or interactive-voice-response providers, or within computer systems installed and managed within the organization. The automated-message service, when provided by a third party or a telephone-service provider, generally features either a telephone-based administration interface 2512 or an on-line administration interface 2514 to allow administrators of the announcement service to configure the announcement service and to change the message provided by the automated attendant to callers of the 800 toll-free number.

The above-described types of announcement-and-bulletin systems are commonly used to inform employees of organizations of facilities closures due to weather or natural disasters, as well as to inform employees and other users of work-scheduling changes, business-related emergencies, and many other types of events. However, the 800-toll-free-number-based announcement-and-bulletin systems are associated with numerous deficiencies. One deficiency is that users can access the announcement-and-bulletin service only through the 800 toll-free number. Users without access to a telephone or located in regions that temporarily or generally lack telephone service cannot access the announcements and bulletins. For similar reasons, the announcements and bulletins can only be changed by an administrator with access to generally either a computer 2516 or a telephone 2518 to enable the administrator to access the automated-announcement service through an administration interface. Another deficiency is that an organization either needs to acquire and devote multiple 800 numbers when the organization wishes to concurrently provide multiple different announcements and bulletins or deploy an interactive-voice-response ("IVR") system accessed through a single 800 number that uses either voice recognition or keyed menu selections to allow users to navigate to appropriate messages. The former approach involves significant expense and administration complexities while the latter approach may entail added costs and temporal inefficiencies. Yet another deficiency is the generally awkward and time-consuming procedures involved in installing and changing the announcements and bulletins distributed through an 800-toll-free-number-based announcement-and-bulletin system.

Figure 26:
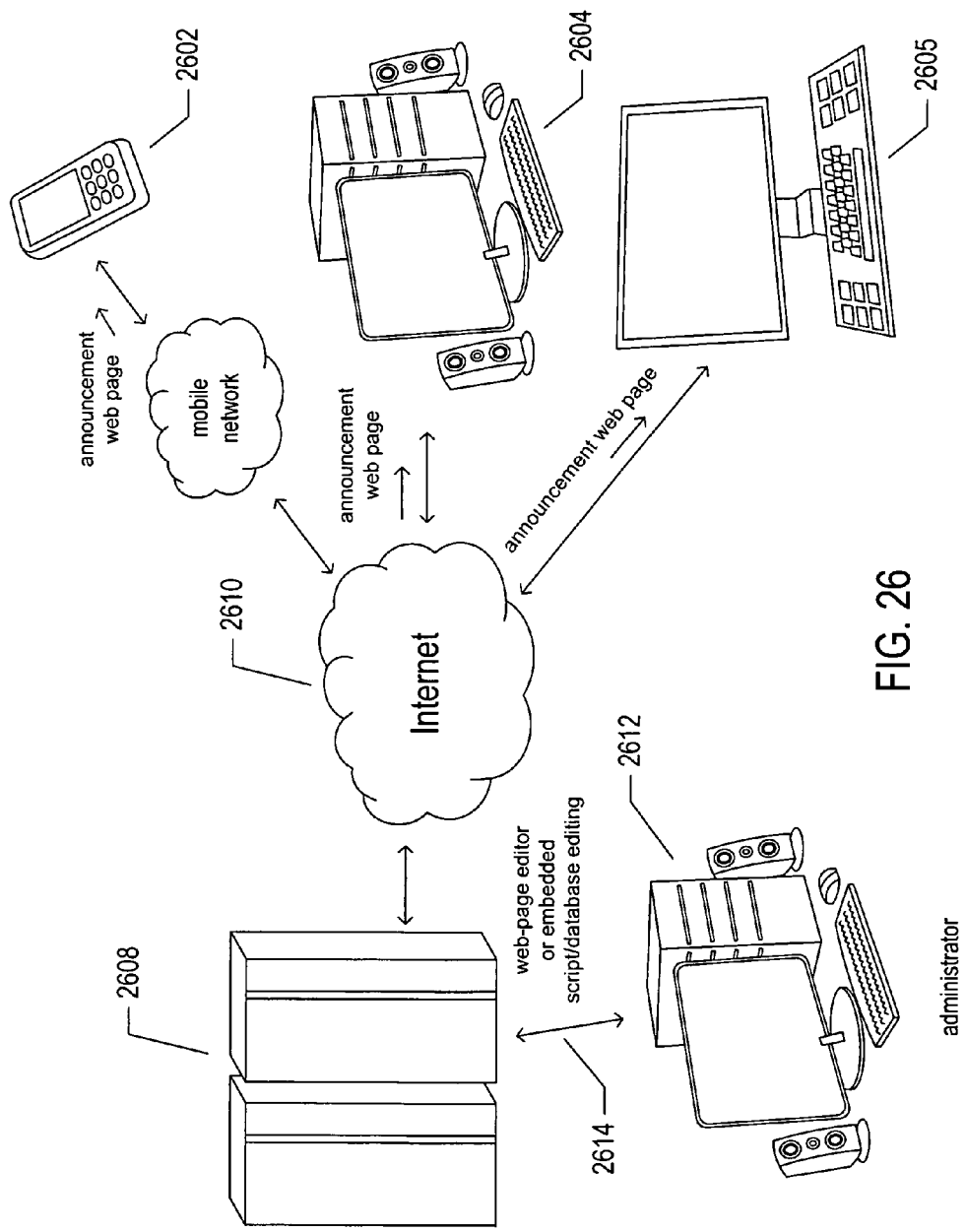
FIG. 26 illustrates a web-page based announcement-and-bulletin system.

FIG. 26 illustrates a web-page based announcement-and-bulletin system. In a web-page announcement-and-bulletin system, users may access announcements and bulletins via smart phones 2602 and various types of computer systems 2604-2605, which additionally include tablets, laptops, and other types of processor-controlled general computing systems as shown in FIG. 26. The announcements and bulletins are furnished texturally in web pages distributed from a web server 2608 via the Internet 2610. An administrator can alter the announcements and bulletins from a computer system 2612 by various different means, including using a web-page editor, editing scripts embedded in the announcements-and-bulletins web page, or editing the contents of a database from which announcements and bulletins are extracted by scripts running within the web page 2614. A web-page-based announcements-and-bulletins system suffers many of the deficiencies discussed above with respect to an 800-toll-free-number announcements-and-bulletins service. Users must have access either to a smart phone, computer, or other computational device which, in turn, is interconnected with the Internet in order to access the announcements-and-bulletins web page. An administrator may need to have access to a particular computer system, depending on where the web server is located and how the web server is managed, in order to install and alter announcements and bulletins. Another significant deficiency inherent in both the 800-toll-free-number-based and web-page based announcement-and-bulletin systems is that they are both based on users accessing the announcement service to obtain announcements and bulletins. In other words, the announcement service has no way of pushing information out to users. While an automatic dialer-type system, similar to those used in advertising and political campaigns, might conceivably be employed for pushing information to users via the public switch telephone network and/or mobile telephone networks, the automated dialing systems may also suffer many, if not all, of the above-discussed deficiencies, and would also exhibit potentially significant latencies in contacting users.

Figure 27:
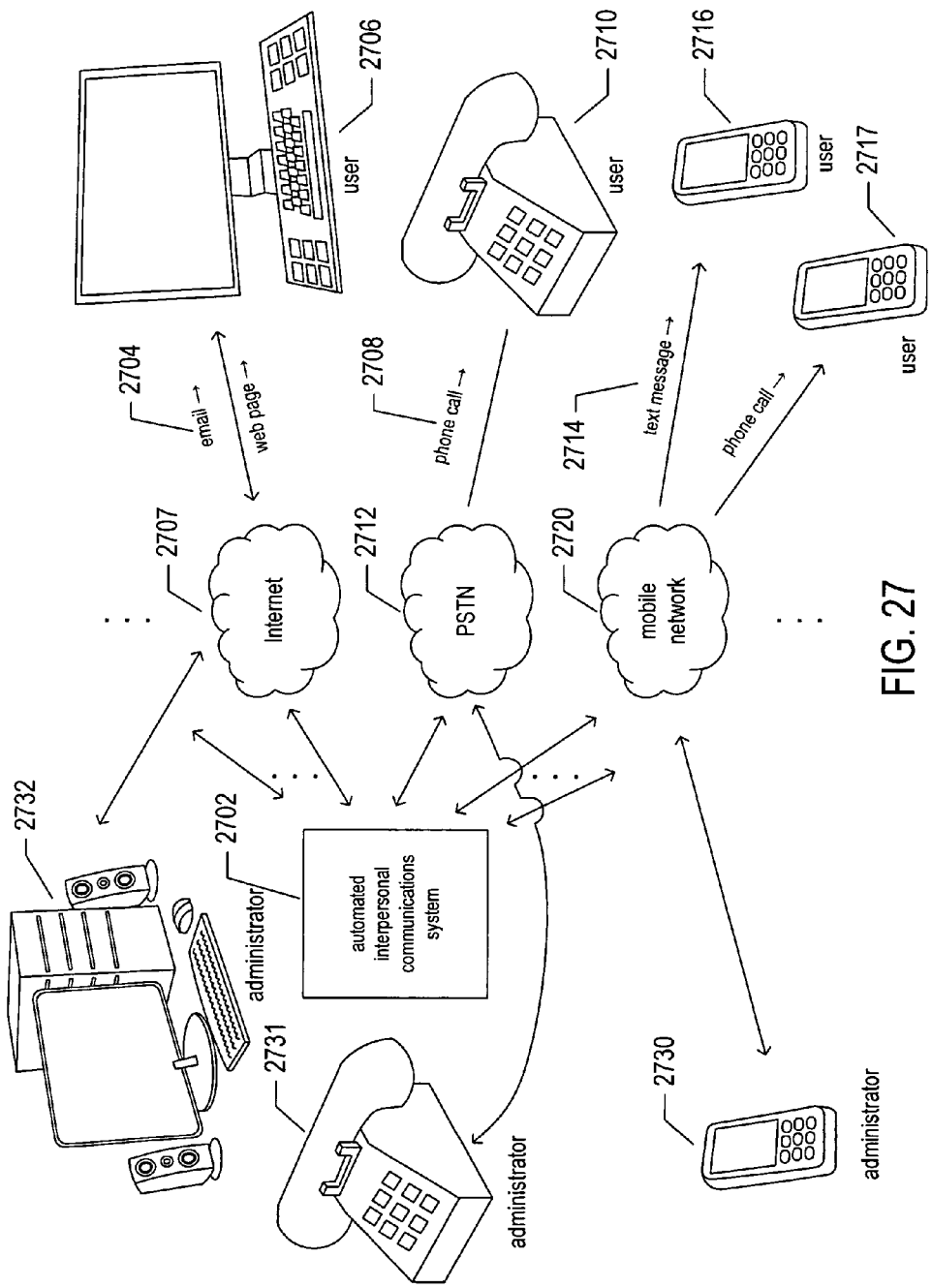
FIG. 27 illustrates characteristics of the automated announcement-and-bulletin service to which the current application is directed.

The automated communications system for interpersonal communications, discussed in the first portion of the current document, provides a cost-effective, easy-to-use, highly functional platform on which to implement an announcement-and-bulletin service. FIG. 27 illustrates characteristics of the automated announcement-and-bulletin service to which the current application is directed. As discussed above, the automated interpersonal-communications system 2702 can be accessed by users through a wide range of communications devices and media, including: (1) via email, instant messaging, and web sites 2704 using various different types of computers and computational devices 2706 through the Internet 2707; (2) via phone calls 2708 from various types of telephones 2710 through the public switch telephone network ("PSTN") 2712; and (3) via text messages, phone calls, email, web pages, and other media 2714 via mobile phones 2716-2717 through the mobile-telephone network 2720. As discussed above, the automated interpersonal communications system 2702 is able to direct incoming messages to appropriate numbers of various hierarchically organized groups. The automated interpersonal communications system is also capable of returning messages, through any of various different devices and communications media, to users from which messages are received. Thus, by establishing groups within the automated and interpersonal communication system responding to announcements and bulletins, appropriate announcements and bulletins can be returned immediately to users sending messages to the groups in order to implement an announcement-and-bulletin system. The system can be administered by administrators using any of the many different types of communications devices and media by which users send messages to, and receive messages from, the automated interpersonal communications system 2730-2732. Furthermore, administrators can not only configure the messages to be automatically returned to accessing users, but may also post messages and bulletins to the announcement-and-bulletin-associated groups in order to push announcements and bulletins to users.

As can be quickly ascertained from inspection of FIG. 27, implementation of the announcements-and-bulletins system within an automated interpersonal communications system, such as that describe above, addresses the deficiencies discussed above with reference to existing announcement-and-bulletin systems illustrated in FIGS. 25 and 26. Provided an administrator has access to any communications device by which the administrator can send messages to the automated interpersonal communications system, the administrator is capable of installing or altering announcements and bulletins subsequently sent out to users. Announcements can reach users over many different types of devices and communications media, rather than via a single type of communications device and communications medium. Users can actively access information or passively receive information with respect to announcements and bulletins. The administrative interface is either similar to, or identical to, the administration interface provided by the automated interpersonal communications system for other administrative tasks and communications tasks. This interface is easy to use, intuitive, and accessible over any of many different communications media through any of many different types of communications devices.

Figure 28:
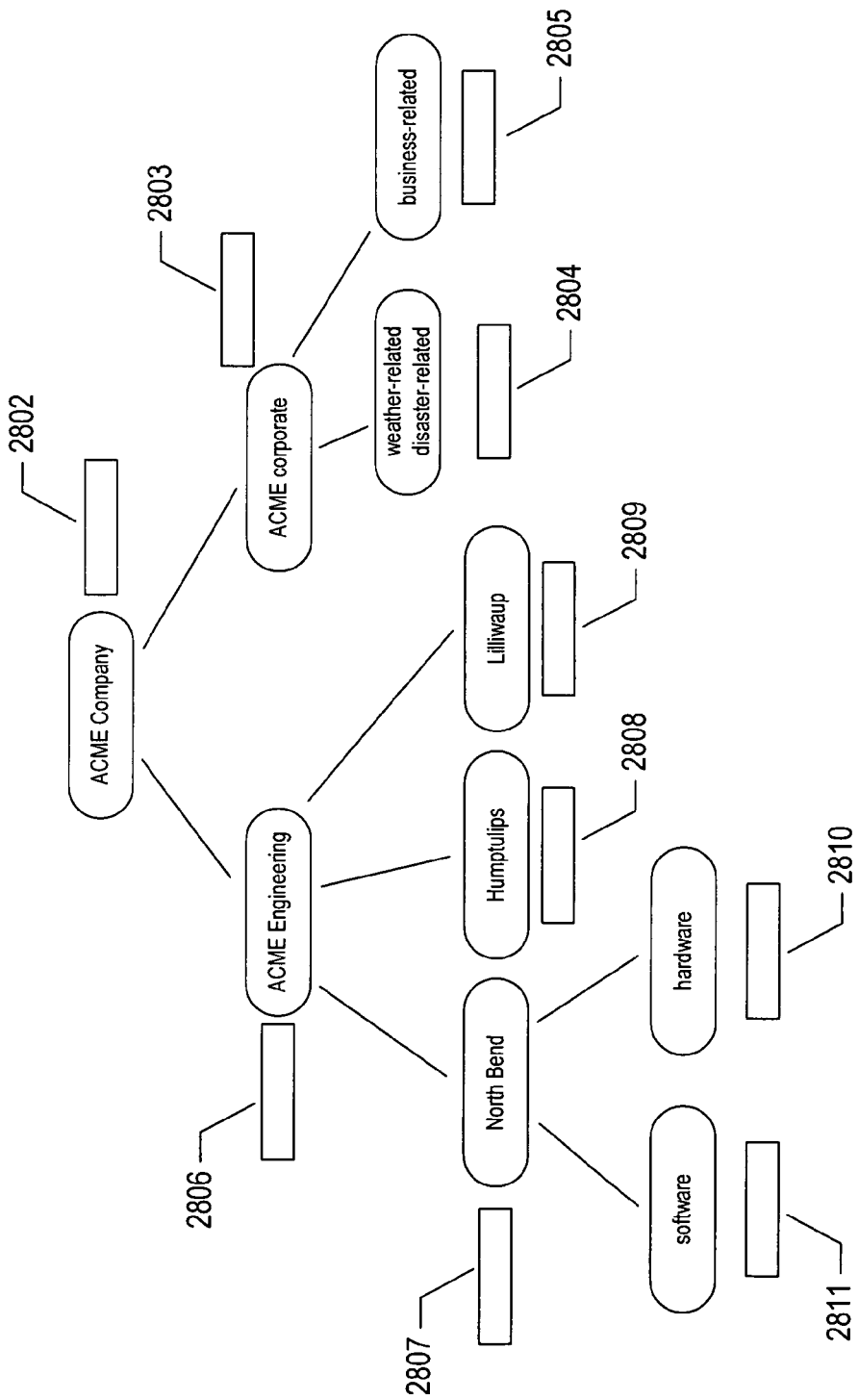
FIG. 28 shows a hierarchical organization of announcements and bulletins that can be provided by an announcement-and-bulletin service implemented within an automated interpersonal communications system.

FIG. 28 shows a hierarchical organization of announcements and bulletins that can be provided by an announcement-and-bulletin service implemented within an automated interpersonal communications system. As shown in FIG. 28, an organization may configure many different hierarchically organized announcements and bulletins 2802-2811, often in the same way that groups and subgroups may be defined and organized within the automated interpersonal communications system. Each different message in the hierarchical organizations of announcements and bulletins may be accessed through a different communications address or number, in certain implementations, or through a common number and selection choices included in messages soliciting announcements and bulletins. In either case, an organization can essentially arbitrarily configure as many different types of hierarchically organized announcement-and-bulletin groups as desired, and the hierarchical organization of the announcements and bulletins may mirror those of user groups and subgroups for general messaging defined by the organization.

Figure 29:
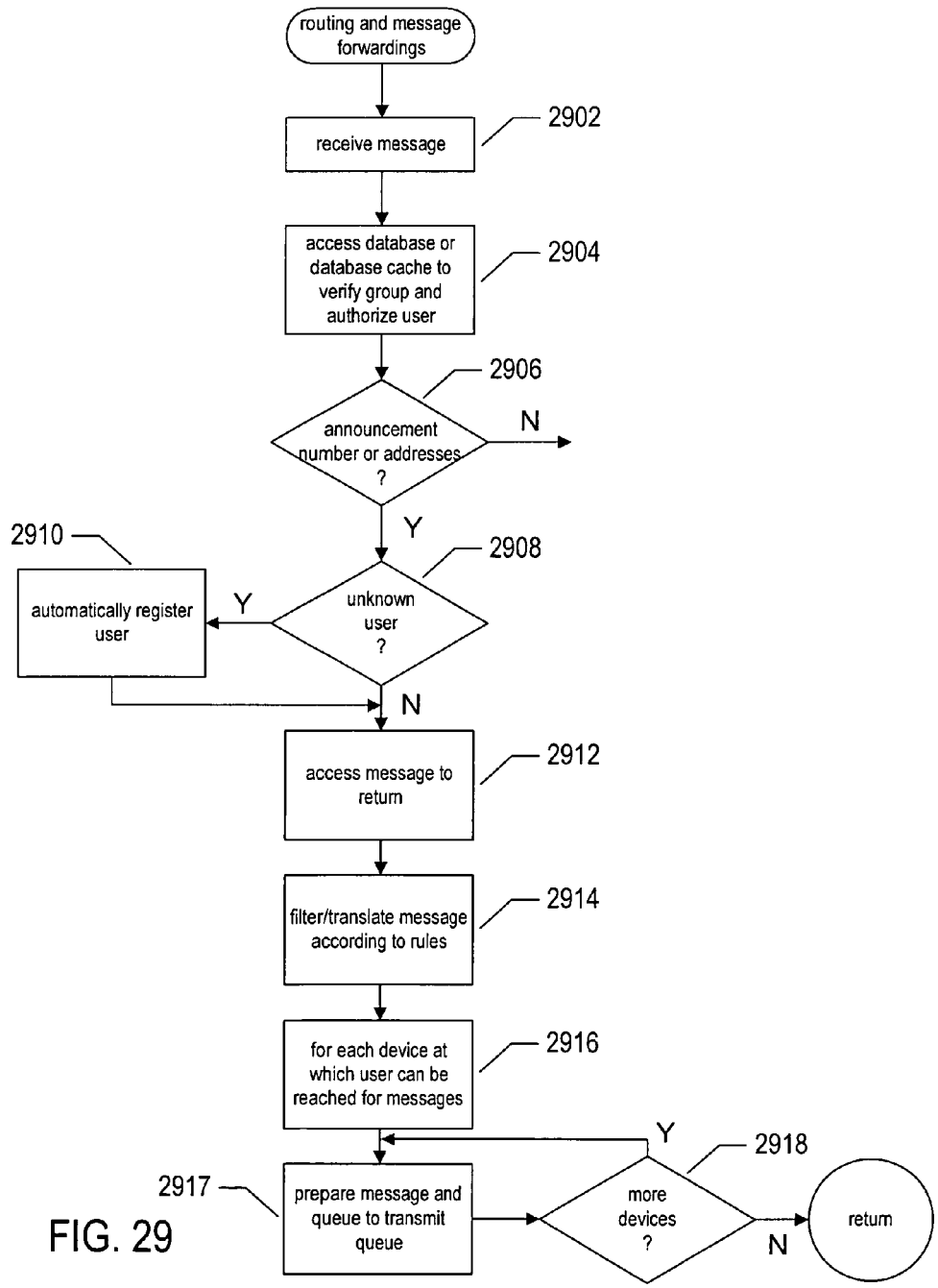
FIG. 29 is a control-flow diagram that illustrates implementation of a pull portion of an announcement-and-bulletin service within an automated interpersonal communications system according to teachings of the current application.

FIG. 29 is a control-flow diagram that illustrates implementation of a pull portion of an announcement-and-bulletin service within an automated interpersonal communications system according to teachings of the current application. FIG. 29 shows a diagram of the routing-and-message-forwarding logic shown above in FIG. 19 specific to the announcement-and-bulletin service. Steps 2902 and 2904 are equivalent to steps 1902 and 1904 in FIG. 19. However, in step 2906, the routing and message forwarding routine determines whether the group is announcements-and-bulletins group or, equivalently, whether the number or address by which the message was received corresponds to an announcements-and-bulletins number or address. When the message is directed to announcements-and-bulletins group, as determined in step 2906, then, in step 2908, the routine determines whether the user is already registered or an unknown user. When the user is an unknown user, the user is automatically registered, in step 2910, with the automated interpersonal communications system. Thus, the announcements-and-bulletins service is not restricted to previously registered or recognized users. In step 2912, the routine accesses the current announcements-and-bulletin message to return the users to direct messages to the announcements-and-bulletins group identified in step 2904. In step 2914, the message may be further filtered, translated, or processed according to these different types of rules. For example, when it is known that the user speaks a particular language, the message may automatically be translated into that language. Next, in the for-loop of steps 2916-2918, the routine determines all of the devices and associated communications media through which the user can be sent the announcements-and-bulletins message, prepares a message for each of these different devices and communications media, and queues these messages to transmit queues. Here again, various rules may be applied to direct particular types of announcements and bulletins to particular subsets of user devices. Additionally, historical data may be employed to select devices through which the user has been most efficiently reached in the past. Similar implementations may be provided for the push portion of an automated announcement-and-bulletin system implemented within the automated interpersonal communications system. The announcement-and-bulletins system may also be configured and used by organizations and individuals to distribute information, including phone numbers, social-networking-site-page links, links to world-wide-web pages, email addresses, and other such information associated with the organization or individual that a user can retrieve from the announcement-and-bulletins system knowing only a phone number or email address for the organization or individual.

Although the present invention has been described in terms of particular embodiments, it is not intended that the invention be limited to these embodiments. Modifications will be apparent to those skilled in the art. For example, announcement-and-bulletins systems that represent embodiments of the present invention may be implemented in many different ways by varying any of many different implementation parameters, including programming languages, control structures, modular organization, data structures, operating-system platforms, and hardware platforms. Any of many different types of communications addressing and communications-direction schemes can be employed to direct messages from users into the announcement-and-bulletins systems, such as the hierarchical email-address scheme discussed with reference to FIG. 14. Announcement-and-bulletins systems that represent embodiments of the present invention can be adapted to distribute information and facilitate exchange of information by members of an organization over a wide variety of different types of communications media and through many different types of communications devices. In general, the announcement-and-bulletins systems that represent embodiments of the present invention are implemented in a highly modular fashion to allow for straightforward addition of communications-medium support and communications-device support for new types of communications media and devices.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An announcement-and-bulletins system comprising:
one or more communications receivers, transmitters, and transceivers interconnected to one or more routers, one or more proxy servers, one or more load balancers, one or more application servers, and one or more database servers via a local network that together implement an input processing subsystem, a post-processing subsystem, and a system-services subsystem; and
an announcement-and-bulletins component implemented within a routing-and-message-forwarding component of the system-services subsystem that
identifies an incoming announcement-and-bulletins message forwarded to the system-services subsystem by the input processing subsystem, the incoming announcement-and-bulletins message originally sent to the announcement-and-bulletins system from one of various types of user devices, including desktop and mobile computers, cell phones, and landline phones, messages from each of the various types of user devices received by a different type of receiver or transceiver and forwarded to a corresponding receiving component,
determines one or more target user devices to which to return a corresponding outgoing announcement-and-bulletins message, and
for each target user device,
generates an appropriate outgoing announcement-and-bulletins message, and
forwards the outgoing announcement-and-bulletins message to the post-processing system for transmission to the user device.

2. The announcement-and-bulletins system of claim 1 wherein the input-processing subsystem processes messages received from the one or more communications receivers, transmitters, and transceivers by:
forwarding each message directed to a management-and-configuration interface and each announcement-and-bulletins message to a routing-and-message-forwarding component that returns a corresponding message, and
forwarding each message directed to a group to the routing-and-message-forwarding component which returns a corresponding message for each member of the group, and
queues the one or more corresponding messages to one or more internal queues.

3. The announcement-and-bulletins system of claim 2 wherein the post-processing subsystem
dequeues messages from the one or more internal message queues,
processes each message dequeued messages from the one or more internal message queues to generate one or more processed messages, and
forwards the one or more processed messages to one or more sending components.

4. The announcement-and-bulletins system of claim 3 wherein the receiving components and sending components include:
SMTP servers connected to the Internet;
voice-communications servers and modems connected to public switched telephone networks;
XMPP servers connected to the Internet;
SMPP servers connected to the Internet;
HTTP servers connected to the Internet;
TCP/IP servers connected to the Internet; and
other types of message-receiving servers interconnected to wireless communications receivers, LAN devices, and other appropriate communications media.

5. The announcement-and-bulletins system of claim 1 wherein the system-services subsystem includes:
a database and database interface;
application servers that each provides management, configuration, message-sending, and message-receiving user interfaces on one or more types of communications devices;
a management-and-configuration component; and
the routing-and-message-forwarding component.

6. The announcement-and-bulletins system of claim 5 wherein the database stores data structures representing:
each organization for which intra-organization communications services are provided by the automated communications system;
each group of members defined for an organization to which messages can be sent by members of the organization;
each member of an organization who receives and/or sends messages to other members of the organization through the automated communications system; and
the announcement-and-bulletins component.

7. The announcement-and-bulletins system of claim 6 wherein the database additionally stores mappings that map:
groups to organizations;
members to groups;
groups to nodes of a hierarchical group structure; and
users to the announcement-and-bulletins component.

8. The announcement-and-bulletins system of claim 6 wherein the database additionally stores data structures representing:
each type of communications device and protocol through which a user of the announcement-and-bulletins system receives and/or sends messages to the announcement-and-bulletins system; and
each receiving and sending component of the automated communications system.

9. The announcement-and-bulletins system of claim 6 wherein the database additionally stores mappings that map:
each communications device to one or more receiving-and-sending components; and
each type of communications device and protocol to other types of communications devices and protocols with which messages and other information can be exchanged.

10. The announcement-and-bulletins system of claim 5 wherein the management-and-configuration subsystem provides management facilities that allow an authorized user to:
create a group of members of an organization;
add members of an organization to a group;
delete members of an organization from a group;
add a subgroup to a group;
remove a subgroup from a group;
delete a group;
edit information stored in the database that describes an organization;
edit information stored in the database that describes a member of an organization;
register a user of the announcement-and-bulletins system; and
generate and deploy processing components and data that, in turn, generate an appropriate outgoing announcement-and-bulletins message for each received incoming announcement-and-bulletins message.

11. The announcement-and-bulletins system of claim 5 wherein the management-and-configuration component provides configuration facilities that allow an authorized user to:
- add message-receiving and message-sending components to the automated communications system;
- delete message-receiving and message-sending components from the automated communications system;
- launch system services, including various types and levels of logging and error handling;
- remove system services; and
- specify operational parameters of the automated communications system.

12. The announcement-and-bulletins system of claim 1 to which messages can be sent and from which messages can be received in the form of:
- text-based email messages;
- voice messages;
- MMS messages;
- XML-encoded documents and messages;
- MIME emails;
- instant-messaging messages; and
- telemetry communications between various types of devices and systems via M2M communications.

13. The announcement-and-bulletins system of claim 1 wherein a user may send an announcement-and-bulletins message from a first type of device to the announcement-and-bulletins system and receive a response from the announcement-and-bulletins system on a second type of device.

14. The announcement-and-bulletins system of claim 1 wherein, when the announcement-and-bulletins component fails to identify the user, the announcement-and-bulletins component registers the user.

15. The announcement-and-bulletins system of claim 1 wherein the announcement-and-bulletins component translates the outgoing announcement-and-bulletins message to a different language desired by the user prior to forwarding the outgoing announcement-and-bulletins message to the post-processing system.

16. The announcement-and-bulletins system of claim 1 wherein announcements and bulletins may be logically grouped hierarchically using hierarchical addressing and accessing schemes.

17. The announcement-and-bulletins system of claim 1 wherein one of an organization or individual can configure the announcement-and-bulletins system to return information, including links to social-networking-site pages and world-wide-web pages, phone numbers, email addresses, and other information to users, allowing the users to obtain information about the organization or individual knowing only a phone number or email address for the organization or individual.

* * * * *